(12) United States Patent
Plevel

(10) Patent No.: US 10,505,573 B2
(45) Date of Patent: *Dec. 10, 2019

(54) SYSTEMS AND METHODS FOR ADAPTIVE AVERAGING IN FREQUENCY DOMAIN EQUALIZATION SYSTEMS

(71) Applicant: Aviat U.S., Inc., Milpitas, CA (US)

(72) Inventor: Sreco Plevel, Domzale (SI)

(73) Assignee: Aviat U.S., Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,818

(22) Filed: Dec. 11, 2018

(65) Prior Publication Data
US 2019/0173504 A1 Jun. 6, 2019

Related U.S. Application Data

(63) Continuation of application No. 15/728,472, filed on Oct. 9, 2017, now Pat. No. 10,153,798, which is a
(Continued)

(51) Int. Cl.
*H04B 1/12* (2006.01)
*H04B 1/10* (2006.01)
(Continued)

(52) U.S. Cl.
CPC .............. *H04B 1/123* (2013.01); *H04J 4/005* (2013.01); *H04L 25/0204* (2013.01);
(Continued)

(58) Field of Classification Search
CPC ........ H04B 1/123; H04B 1/1036; H04B 1/10; H04L 25/03159; H04L 27/26;
(Continued)

(56) References Cited

U.S. PATENT DOCUMENTS 6,608,863 B1    8/2003  Onizawa
6,665,296 B1   12/2003  Sturza
(Continued)

FOREIGN PATENT DOCUMENTS

WO    2013055947    4/2013

OTHER PUBLICATIONS

Pancaldi, Fabrizio et al., "Single-Carrier Frequency Domain Equalization," IEEE Signal Processing Magazine, vol. 25, Iss. 5, pp. 37-56, Sep. 2008.
(Continued)

*Primary Examiner* — Andrew Wendell
(74) *Attorney, Agent, or Firm* — Sheppard, Mullin, Richter & Hampton LLP

(57) ABSTRACT

An example system comprises a first antenna and a modem. The first antenna is configured to receive a signal from a transmitting radio frequency unit. The signal includes data and a known sequence. The modem is configured to retrieve the known sequence from the signal, transform the known sequence and the data into a frequency domain, calculate averages of groups of neighboring frequency points in the frequency domain to reduce the effect of nonlinear noise in the signal, the neighboring frequency points corresponding to the preamble in the frequency domain, compare the calculated averages to an expected frequency response in the frequency domain, determine a correction filter to apply to the data based on the comparison, apply the correction filter on the data in the frequency domain to create corrected data, transform the corrected data from the frequency domain to the time domain, and provide the data.

21 Claims, 12 Drawing Sheets

Related U.S. Application Data continuation of application No. 14/807,618, filed on Jul. 23, 2015, now Pat. No. 9,787,338.

(60) Provisional application No. 62/028,266, filed on Jul. 23, 2014.

(51) Int. Cl.
    *H04L 27/36*     (2006.01)
    *H04L 25/03*     (2006.01)
    *H04L 25/02*     (2006.01)
    *H04J 4/00*     (2006.01)
    *H04L 27/26*     (2006.01)

(52) U.S. Cl.
CPC .... *H04L 25/0228* (2013.01); *H04L 25/03159* (2013.01); *H04L 27/366* (2013.01); *H04L 25/022* (2013.01); *H04L 27/2613* (2013.01); *H04L 27/2647* (2013.01)

(58) Field of Classification Search
CPC ............. H04L 25/0204; H04L 25/0228; H04L 27/366; H04L 27/2647; H04L 27/2613; H04L 25/022; H04J 4/005
See application file for complete search history.

(56) References Cited

U.S. PATENT DOCUMENTS

| | | | |
|---|---|---|---|
| 6,693,984 | B1 | 2/2004 | Andre |
| 6,876,645 | B1 | 4/2005 | Guey |
| 7,082,159 | B2 | 7/2006 | Larsson |
| 9,787,338 | B2 * | 10/2017 | Plevel ............... H04B 1/123 |
| 10,153,798 | B2 * | 12/2018 | Plevel ............... H04B 1/123 |
| 2004/0229650 | A1 | 11/2004 | Fitton |
| 2007/0036066 | A1 | 2/2007 | Thomas |
| 2007/0147479 | A1 | 6/2007 | Yamasuge |
| 2007/0260431 | A1 | 11/2007 | Ozluturk |
| 2008/0212666 | A1 | 9/2008 | Kuchi |
| 2009/0046816 | A1 | 2/2009 | Hong |
| 2011/0013575 | A1 | 1/2011 | Liao |
| 2012/0047416 | A1 | 2/2012 | Oh |
| 2013/0016793 | A1 | 1/2013 | Dybdal |
| 2013/0039446 | A1 | 2/2013 | Roh |
| 2014/0169488 | A1 | 6/2014 | Varanese |

OTHER PUBLICATIONS

European Patent Application No. 15825505.9, Search Report dated Mar. 12, 2018.

International Application No. PCT/US2015/041823, International Search Report and Written Opinion dated Oct. 15, 2015.

* cited by examiner

SYSTEMS AND METHODS FOR ADAPTIVE AVERAGING IN FREQUENCY DOMAIN EQUALIZATION SYSTEMS

CROSS-REFERENCE TO RELATED APPLICATIONS

The present application is a continuation of U.S. patent application Ser. No. 15/728,472, filed Oct. 9, 2017 and entitled "Systems and Methods for Adaptive Averaging in Frequency Domain Equalization Systems," now U.S. Pat. No. 10,153,798, which claims priority to Ser. No. 14/807,618, filed Jul. 23, 2015 and entitled "Systems and Methods for Adaptive Averaging in Frequency Domain Equalization Systems," now U.S. Pat. No. 9,787,338, which claims priority to U.S. Provisional Patent Application Ser. No. 62/028,266, filed Jul. 23, 2014 and entitled "Adaptive Averaging in Frequency for FDE Systems," which are hereby incorporated by reference herein.

BACKGROUND

1. Field of the Invention(s)

The present invention(s) generally relate to frequency domain equalization systems in wireless communication systems. More particularly, the invention(s) relate to systems and methods for averaging frequency points in frequency domain equalization systems in wireless communication systems.

2. Description of Related Art

Wireless communication systems often face the challenge of fading channels that are time and frequency selective. Equalization of signals in the time domain and/or frequency domain may correct for at least some of the errors in the channel. Frequency Domain Equalization (FDE) may lead to a lower computational complexity and may offer improved convergence properties compared to time division equalization.

Frequency domain equalization has been utilized in WiMax and LTE systems to correct for intersymbol interference caused by multipath signals and reflections. Frequency domain equalization in these systems, however, may not correct for nonlinear distortions caused by components of the transmitter (e.g., by a power amplifier in the transmitter) and/or nonlinear effects in the receive chain.

SUMMARY OF THE INVENTION

An example system comprises a first antenna and a modem. The first antenna is configured to receive a signal from a transmitting radio frequency unit. The signal includes data and a known sequence. The modem is configured to retrieve the known sequence from the signal, transform the known sequence and the data into a frequency domain, calculate averages of groups of neighboring frequency points in the frequency domain to reduce the effect of nonlinear noise in the signal, the neighboring frequency points corresponding to the preamble in the frequency domain, compare the calculated averages to an expected frequency response in the frequency domain, determine a correction filter to apply to the data based on the comparison, apply the correction filter on the data in the frequency domain to create corrected data, transform the corrected data from the frequency domain to the time domain, and provide the data.

In some embodiments, the system further comprises a filter configured to adjust the signal to correct for known hardware imperfections of a receiver coupled to the first antenna. The modem may further identify and retrieve a cyclic prefix from the signal. In various embodiments, at least some of the nonlinear noise is generated by components of the transmitting radio frequency unit. Some of the nonlinear noise may be generated by components of the receiving radio frequency unit.

The correction filter may be configured to apply an inverse between the difference of the calculated averages and the expected frequency response in the frequency domain to the data. The modem may be further configured to select a correction filter from a plurality of preexisting correction filters based on the comparison of the calculated averages to the expected frequency response. The expected frequency response may be generated by transforming a reference signal to the frequency domain, the reference signal comprising a same sequence of symbols as the known sequence, the reference signal having not been transmitted from the transmitting radio frequency unit to the first antenna.

The modem may be a part of a microwave receiving radio frequency unit coupled to the first antenna. Further, the transmitting radio frequency unit may transmit the signal to the microwave receiving radio frequency unit via line of sight propagation.

An example method may comprise receiving a signal from a transmitting radio frequency unit, the signal including data and a known sequence of a predetermined length, retrieving the known sequence from the signal, transforming the known sequence and the data into a frequency domain, calculating averages of groups of neighboring frequency points in the frequency domain to reduce the effect of nonlinear noise in the signal, the neighboring frequency points corresponding to the preamble in the frequency domain, comparing the calculated averages to an expected frequency response in the frequency domain, determining a correction filter to apply to the data based on the comparison, applying the correction filter on the data in the frequency domain to create corrected data in the frequency domain, transforming the corrected data from the frequency domain to the time domain, and providing the data.

An example nontransitory computer readable medium may comprise instructions executable by a processor to perform a method. The method may comprising receiving a signal from a transmitting radio frequency unit, the signal including data and a known sequence of a predetermined length, retrieving the known sequence from the signal, transforming the known sequence and the data into a frequency domain, calculating averages of groups of neighboring frequency points in the frequency domain to reduce the effect of nonlinear noise in the signal, the neighboring frequency points corresponding to the preamble in the frequency domain, comparing the calculated averages to an expected frequency response in the frequency domain, determining a correction filter to apply to the data based on the comparison, applying the correction filter on the data in the frequency domain to create corrected data in the frequency domain, transforming the corrected data from the frequency domain to the time domain, and providing the data.

BRIEF DESCRIPTION OF THE DRAWINGS

The drawings are provided for purposes of illustration only and merely depict typical or example embodiments.

These drawings are provided to facilitate the reader's understanding and shall not be considered limiting of the breadth, scope, or applicability various embodiments.

DETAILED DESCRIPTION OF THE INVENTION

Figure 1:
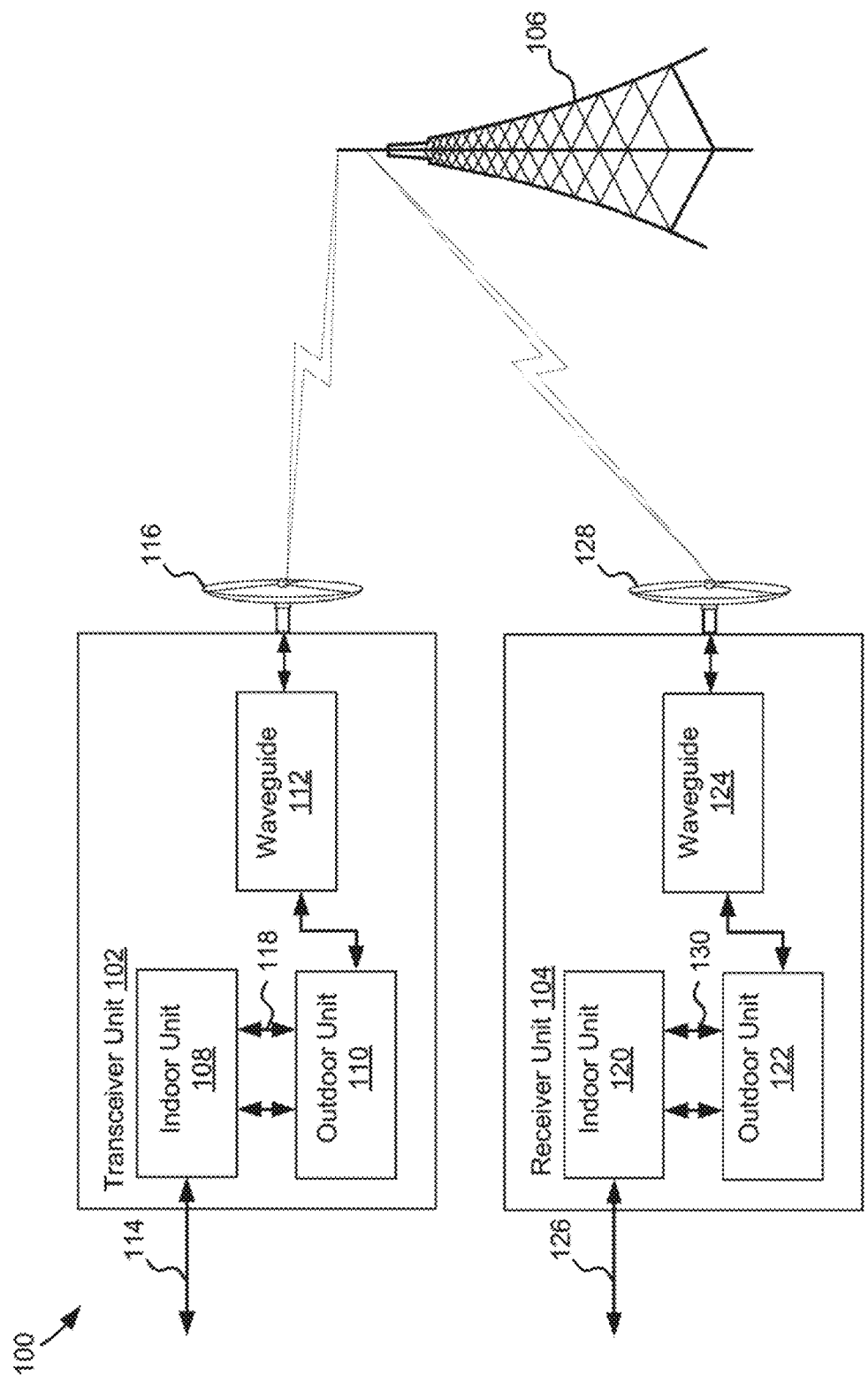
FIG. 1 is a block diagram of an example wireless communication system that may utilize functionality described herein in some embodiments.

In various embodiments, frequency domain equalization may be applied in microwave transmission systems (e.g., capable of 80 GHz). Channel estimation can be improved with averaging of the preamble (channel estimation) through several instances and may be effective if the channel is not significantly changing during time of averaging and the noise is uncorrelated. However in some cases noise is correlated. Examples of correlated noise include errors due to I/Q imbalances or Power Amplifier nonlinearities, which standard linear equalizers cannot correct. Such impairments influence channel estimation accuracy which in turn further degrades demodulation performance. For example, complex symbols with I and Q analog components may become imbalanced in transmission and/or noise produced by components of the wireless transmission system. If the imbalance is nonlinear and corrective action is not taken, errors may occur during frequency domain equalization which may render frequency domain estimation incorrect.

In some embodiments, a transmitter of a microwave transmission system may add a predefined known sequence (i.e., a preamble) periodically to the signal. To reduce the effect of nonlinear noise that may be caused by components of the transmitter, components of the receiver, and the channel, the receiver may average groups of a predetermined number of frequency points associated with the preamble in the frequency domain. The averaged groups in the frequency domain may be compared to an expected response in the frequency domain (e.g., the expected response being generated by a reference known sequence). Based on the comparison, the receiver may generate or select correction filter(s) (e.g., generate a filter based on an inverse function) to remove all or part of the difference between the expected response and the average to correct for at least some nonlinear and/or linear noise in the signal. The filter(s) may be applied to data within the signal.

By adding proper averaging of channel estimation in frequency domain, the modem may be more robust to non-linear distortions of transmitting power amplifier. As a result, higher transmit powers may be achieved for given level of degradation of received sensitivity or residual BER. In some embodiments, the modem may be more robust to many impairments that are highly correlated in time, like I/Q imbalances or quantization errors on reference symbol used for channel estimation. As residual SNR is increased, higher level modulations may be achieved allowing higher data rates. Further, averaging in time may be decreased thus achieving faster tracking of channel dynamics. Alternatively, reference symbols (preamble) may be sent less often and thus increase user data rate of the system. Moreover, results from algorithms for determination of optimal filtering in frequency domain may be used as metrics to separate impact of different impairments influencing received signal quality.

In some embodiments, frequency domain equalization may be utilized to make further corrections to the signal in the time domain.

FIG. 1 is a block diagram 100 of an example wireless communication system that may utilize functionality described herein in some embodiments. The block diagram 100 comprises a transceiver unit 102 that communicates via an antenna 116 over a communication tower 106 with receiver unit 104 via antenna 128. It will be appreciated that, in some embodiments, the transceiver unit 102 may communicate directly with the receiver unit 104 and the communication tower 106 is optional.

The transceiver unit 102 and the receiver unit 104 may be components of a microwave communication system. In some embodiments, the transceiver unit 102 and the receiver unit 104 are within line of sight. As a result, the wireless transmission between the transceiver unit 102 and the receiver unit 104 may not have reflections associated with non-line of sight systems (e.g., such as LTE and WiFi).

The transceiver unit 102 and the receiver unit 104 may, in some embodiments, be split mount systems. In split mount microwave radio systems, the transceiver 102 may include an indoor unit (IDU) 108 and an outdoor unit (ODU) 110 coupled to an antenna 116 via a waveguide 112. The IDU 108 may be coupled to a server or other computer over a wired network (e.g., LAN, WAN, or the Internet) or to a mobile network base-station. Information to be wirelessly transmitted may be received from a digital device over communication path 114. The IDU 108 and the ODU 110 may prepare the information for wireless transmission. All or parts of the IDU 108 and/or ODU 110 may include all or part of a transmitting radio frequency unit discussed herein. In some embodiments, the ODU 110 may receive signals from the antenna 116 to provide to the server, other computer, or mobile network node via the IDU 108.

Similarly, the receiver unit 104 may include an indoor unit (IDU) 120 and an outdoor unit (ODU) 122 coupled to an antenna 128 via a waveguide 124. The IDU 120 may be coupled to a server or other computer over a wired network (e.g., LAN, WAN, or the Internet) or to a mobile network base-station. Information received from the antenna 128 (e.g., from the transceiver unit 102) may be processed by the ODU 122 and the IDU 120 before providing information associated with the received signal over the communication path 126. All or parts of the IDU 108 and/or ODU 110 may include all or part of a receiving radio frequency unit discussed herein.

The waveguides 112 and 124 may be any kind of waveguides and are further discussed herein.

Figure 2:
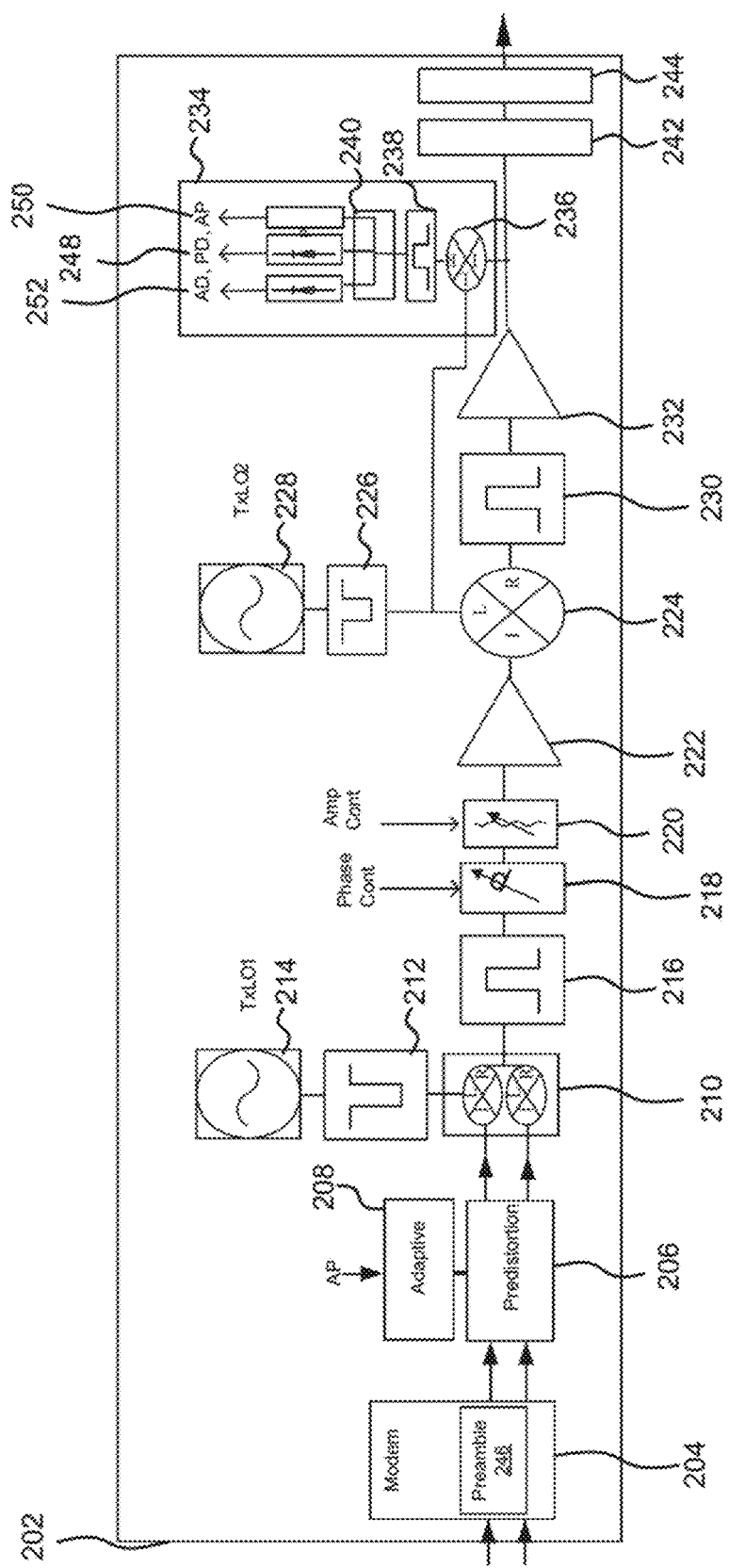
FIG. 2 is a block diagram of an example transmitting radio frequency unit in some embodiments.

FIG. 2 is a block diagram 200 of an example transmitting radio frequency unit 202 in some embodiments. Although only a single transmitting radio frequency unit 202 is shown in FIG. 2, it will be apparent that there may be any number of transmitting radio frequency units that may transmit to any number of receiving radio frequency units. The transmitting radio frequency unit 202 may be any transmitter including, but not limited to, a heterodyne transmitter with a TX intermediate frequency (IF) output. It will be appreciated that any number of transmitting radio frequency units may be used to transmit the same signal (e.g., signals containing the same information provided by a wireless communication source).

In some embodiments, the transmitting radio frequency unit 202 may transmit redundant information in different polarizations. For example, the transmitting radio frequency unit 202 may transmit information on a horizontal polarization of a signal and redundant information on a vertical polarization of the signal. One or more receiving radio frequency units (discussed herein) may receive and combine the information from the different polarizations.

The transmitting radio frequency unit 202 may include one or more processors and memory. Each of these components may be in communication, directly or indirectly, with each other (e.g., over one or more buses). In some embodiments, some components of transmitting radio frequency unit 202 may be controlled and/or implemented with one or more application-specific integrated circuits (ASICs) adapted to perform some or all of the functions. In various embodiments, the functions may be performed by one or more other processing units (or cores), on one or more integrated circuits. It will be appreciated that other types of integrated circuits may be used (e.g., Field Programmable Gate Arrays (FPGAs) or Structured/Platform ASICs) which may be programmed.

The processor(s) may include a central processing unit (CPU), a microcontroller, an application-specific integrated circuit (ASIC), and/or the like. The memory may include random access memory (RAM) or read-only memory (ROM). The memory may store computer-readable, computer-executable instructions that are configured to, when executed, control any number of the one or more processor(s).

The transmitting radio frequency unit 202 may comprise a modem 204 with a preamble module 246, a predistortion module 206, an adaptive module 208, amplification/attenuation modules 222 and 232, filter modules 212, 216, 226, 230, and 238, mixer modules 210, 224, and 236, oscillator modules 214 and 228, a signal quality control module 234, an automatic gain control (AGC) module 220, and a phase adjuster 218. In some embodiments, the transmitting radio frequency unit 202 may comprise a waveguide filter 242 and a waveguide 244 coupled to an antenna.

Figure 3:
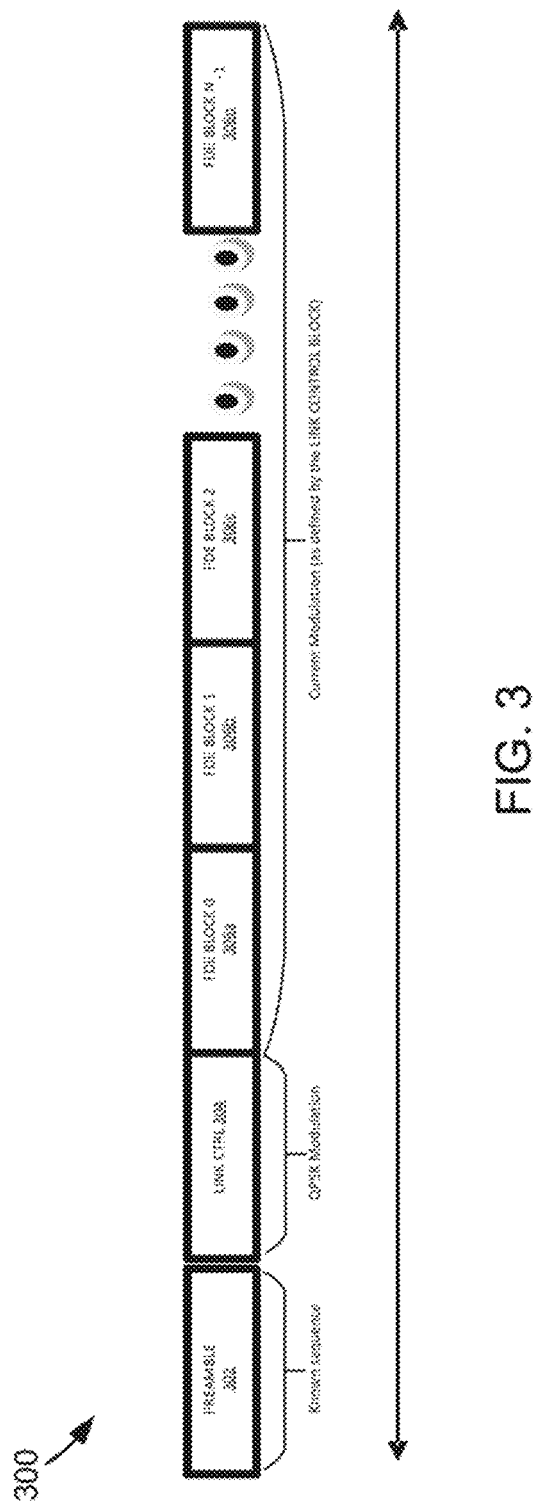
FIG. 3 shows a depiction of a frame that may be provided by the transmitting radio frequency unit to a receiving radio frequency unit in some embodiments.

The modem 204 may be any modem configured to receive and modulate one or more signals to encode information to be transmitted. In some embodiments, the modem 204 may receive or generate a Quadrature Amplitude Modulated (QAM) sample stream and insert a cyclic prefix (CP) for each FDE-block of the QAM sample stream. In some embodiments, the preamble includes a cyclic prefix to transform a linear channel convolution into a circular one. The QAM sample stream with inserted CPs may then be transmitted to the receiving base station via antenna(s). An example frame is shown in FIG. 3.

In various embodiments, the modem 204 (e.g., the preamble module 246 of the modem 204) may include a predefined preamble to be transmitted in a frame. The preamble is a known sequence of any length. For example, the preamble may by 64 or 256 symbols. The length of the preamble may be selected based on an estimation of the channel and noise that may be caused by components of the transmitting radio frequency unit 202 and/or the receiving radio frequency unit.

The modem 204 may include a predefined preamble at any time (e.g., on every frame). For example, the modem 204 may include a predefined preamble at given intervals (e.g., every 1 millisecond).

In some embodiments, the modem 204 may provide inphase (I) and quadrature (Q) signals to the predistortion module 206. The predistortion module 206 may receive the signal from the modem 204 and improve the linearity of the signal. In various embodiments, the predistortion module 206 inversely models gain and phase characteristics and produces a signal that is more linear and reduces distortion. In one example, "inverse distortion" is introduced to cancel non-linearity. The predistortion module 206 may receive a predistortion control signal from the adaptive module 208 or a signal quality control module 234. The adaptive module 208 may provide the predistortion control signal based on a distortion control signal from the signal quality control module 234 described herein. The predistortion module 206 may provide the altered (e.g., with added predistortion) I and Q signals to the mixer module 210.

The mixer module 210, filter module 212, and the oscillator module 214 may represent an upconverter configured to upconvert the signals to an intermediate frequency signal. Similarly, the mixer module 224, filter module 226, and oscillator module 228 also may represent an upconverter configured to further upconvert the signal to a final RF signal. Those skilled in the art will appreciate that there may be any number of upconverters configured to upconvert the signals within the transmitting radio frequency unit 202.

The mixer modules 210, 224, and 236 may comprise mixers configured to mix the signal(s) provided by the modem with one or more other signals. The mixer modules 210, 224, and 236 may comprise many different types of mixers with many different electrical properties. In one example, the mixer 210 mixes I and Q signals received from the filter module predistortion module 206 with the filtered oscillating signal from the filter module 212 and the oscillator module 214. In another example, the mixer module 224 mixes a signal received from the amplifier/attenuator module 222 with the filtered oscillating signal from the filter module 226 and the oscillator module 228. In some embodiments, the mixer module 236 mixes the RF signal from the amplifier/attenuator module 232 with the filtered oscillator signal from the oscillator module 228 and the filter module 226.

Those skilled in the art will appreciate that each of the mixers 210, 224, and 236 may be the same as one or more other mixer modules. For example, mixer modules 210 and 224 may both be mixers sharing the same electrical properties or, alternately, the mixer modules 210 and 224 may be another kind of mixer and/or with different electrical properties.

Each mixer modules 210, 224, and 236 may include one or more components. For example, the mixer module 210 may comprise one or more mixers.

The filter modules 212, 216, 226, 230, and 238 may comprise filters configured to filter the signal. The filter modules 212, 216, 226, 230, and 238 may comprise many different types of filters (e.g., bandpass filter, low pass filter, high pass filter, or the like) with many different electrical properties. In one example, the filter module 212 may be a band pass filter configured to filter the signal (or components of the signal) provided from the predistortion module filter module 216. Similarly, filter modules 216, 226, 230, and 238 may filter signals (or components of the signals) from the oscillator module 214, the oscillator module 228, the mixer module 210, or the mixer module 236, respectively.

Those skilled in the art will appreciate that each of the filter modules 212, 216, 226, 230, and 238 may be the same as one or more other filter modules. For example, filters module 212 and 216 may both be filters sharing the same electrical properties while filter module 226 may be another kind of filter. In another example, filters module 212 and 216 may both be filters of a similar type but have different electrical properties.

Each filter modules 212, 216, 226, 230, and 238 may include one or more components. For example, the filter modules 212 may comprise one or more filters.

The oscillator modules 214 and 228 may comprise oscillators configured to provide an oscillating signal that may be used to upconvert the signal. The oscillator modules 214 and 228 may comprise any kind of oscillator with any different electrical properties. In one example, the oscillator module 214 provides an oscillating signal to the filter module 212. The oscillator module 228 may provide an oscillating signal to the filter module 226.

The oscillating modules 214 and 228, either individually or together, may be local or remote. In one example, the oscillating module 214 and/or the oscillating module 228 may be remotely located and configured to provide an oscillating signal to one or more transmitting radio frequency units. In some embodiments, a single oscillating module may provide an oscillating signal to both the mixer module 210 and 224, respectively (e.g., optionally via a filter). In one example, the oscillator signal from the oscillator module may be altered (e.g., oscillation increased or decreased) and provided to a different part of the circuit.

Those skilled in the art will appreciate that each of the oscillator modules 214 and 228 may be the same as each other. For example, oscillator modules 214 and 228 may both be oscillators sharing the same electrical properties or, alternately, the oscillator modules 214 and 228 may be another kind of oscillator and/or with different electrical properties.

Each oscillator modules 214 and 228 may include one or more components. For example, the oscillator module 214 may comprise one or more oscillators.

The signal quality control module 234 may be configured to generate a phase control signal to control the phase of a processed signal. In one example, the signal quality control module 234 receives the upconverted RF signal from the amplifier/attenuator module 232 and mixes the amplified or attenuated signal with the filtered local oscillator or the upconverted signal from the second upconverter (e.g., mixer module 224, filter module 226, and oscillator module 228). The signal quality control module 234 may filter (e.g., using the filter module 238) and compare the filtered, mixed signal with a predetermined phase value to generate a phase control signal based on the comparison.

In some embodiments, a splitter 240 may be used to split the signal between a phase comparator 252, a gain comparator 248, and an adaptive module controller 250. The phase comparator 252 may generate a phase control signal based on a comparison of the phase of the signal from the mixer module 236 with a predetermined phase value. The phase control signal may be provided to the phase adjuster 218. The gain comparator 248 may generate the gain control signal based on a comparison of the gain of the signal from the mixer module 236 with a predetermined gain value. The gain control signal may be provided to the AGC 220. The adaptive module controller 250 may generate the predistortion control signal or a distortion control signal based on a comparison of the desired signal with the signal from the mixer module 236. The adaptive module controller 250 may provide the predistortion control signal or the distortion control signal to the adaptive module 208 and/or the predistortion module 206.

In some embodiments, the splitter 240 may be added to a preexisting transmitting radio frequency unit 202 in order to add the phase and gain control elements thereby reducing costs. The signal quality control module 234 may comprise a variety of different components (e.g., a mixer, filter, splitter, and a comparison module). In various embodiments, one signal quality control module 234 may receive signals from a plurality of different transmitting radio frequency units and provide phase control signals and/or gain control signals to one or more of the different transmitting radio frequency units.

The phase adjuster 218 may comprise a variable phase control circuit configured to increase or decrease the phase of the signal to be transmitted. The phase adjuster 218 may comprise any different type of phase adjuster or phase shifter with different electrical properties. In one example, the phase adjuster 218 increases or decreases the phase of the signal received from the filter module 216. The phase adjuster 218 may adjust the phase of the signal based on the phase control signal from the signal quality control module 234.

The phase adjuster 218 may include one or more components. For example, the phase adjuster 218 may comprise one or more phase control elements.

The AGC module 220 may comprise an automatic gain control (AGC) circuit configured to increase or decrease the gain of the signal received from the phase adjuster 218. The AGC module 220 may comprise many different types of AGCs with many different electrical properties. In one example, the AGC module 220 increases or decreases the gain of the signal received from the phase adjuster 218. The AGC module 220 may adjust the gain of the signal based on the gain control signal.

The AGC module 220 may include one or more components. For example, the AGC module 220 may comprise one or more AGCs.

The amplification/attenuation modules 222 and 232 may comprise an amplifier and/or an attenuator configured to amplify and/or attenuate a signal. The amplification/attenuator modules 222 and 232 may be any kind of amplifiers and/or attenuators. Further, the amplification/attenuator modules 222 and 232 may each comprise amplifiers and/or attenuators with any kind of electrical properties.

In some embodiments, the amplifier/attenuator module 222 receives a signal from the AGC module 220. The amplifier/attenuator module 222 may amplify or attenuate the signal. Further, the amplifier/attenuator module 232 may be a power amplifier. In some embodiments, the power amplifier may amplify the signal (or components of the signal) after the signal has been upconverted by the mixer module 224, the filter module 226, and the oscillator module 228. The power amplifier may introduce nonlinear noise into the signal. The amplifier/attenuator module 232 may provide the signal to the signal quality control module 234 and/or the waveguide filter 242.

Those skilled in the art will appreciate that each of the amplifier/attenuator modules 222 and 232 may be the same as one or more other amplifier/attenuator modules. For example, amplifier/attenuator modules 222 and 232 may both be amplifiers sharing the same electrical properties. In another example, amplifier/attenuator modules 222 and 232 may both be amplifiers but have different electrical properties.

Each amplifier/attenuator module 222 and 232 may include one or more components. For example, the amplifier/attenuator module 222 may comprise one or more amplifiers and/or attenuators.

In some embodiments, the transmitting radio frequency unit 202 may comprise the waveguide filter 242, the waveguide 244, and/or a diplexer. The waveguide filter 242 may be any filter coupled to the waveguide 244 and configured to filter the electromagnetic waves (e.g., remove noise). The waveguide 450 may provide the signal to the antenna via a diplexer. The diplexer may provide the signal to the antenna. The waveguide 244 may be any waveguide kind or type of waveguide. For example, the waveguide 244 may be hollow or dielectric. In some embodiments, the waveguide 244 comprises a rectangular to circular waveguide.

In some embodiments, the transmitting radio frequency unit 202 and one or more other transmitting radio frequency units are coherent transmitters. A reference signal module (not depicted) may provide a reference signal to any number of transmitting radio frequency units. In some embodiments, the reference signal module receives multiple signals (e.g., I and Q signals) and passes the signals through a phase lock loop comprising phase detector, filter module, and oscillator module. The phase detector may detect the phase of the incoming signals and/or compare the phase to that of the oscillator signal of oscillator module. The signal may be filtered by filter module. The phase may be corrected until the desired phase of the reference signal is reached before providing the reference signal(s). In various embodiments, the oscillator module shares the oscillator signal with one or more other reference signal modules of other transmitting radio frequency units. The oscillator 422 may also provide an oscillator signal to the filter module 212 and/or the filter module 226 thereby making oscillator modules 214 and/or 228 unnecessary.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Although FIG. 2 depicts one transmitting radio frequency unit, those skilled in the art will appreciate that there may be any number of transmitting radio frequency units, antennas, diplexers, wireless communication sources and/or combiners.

FIG. 3 shows a depiction of a frame 300 that may be provided by the transmitting radio frequency unit 202 to a receiving radio frequency unit in some embodiments. It will be appreciated that the frame depicted in FIG. 3 is one example and that there may be many different frames that include other information or information contained in a different organization. The example frame 300 comprises a preamble 302, a link control block 304, and FDE blocks 0, 1, 2 . . . N−1 306a-n. As discussed herein, the preamble 302 may comprise a known sequence. The preamble may be added to the frame by the preamble module 246 of the modem 204. The link control block 304 may indicate the modulation of the frame and include other information to assist in the demodulation of data by the receiving radio frequency unit. The FDE blocks 306a-n may include information to be transmitted from the transmitting radio frequency unit 202 to the receiving radio frequency unit. It will be appreciated that there may be any number of FDE blocks. The frame 300 may also include a cyclic prefix attached to the frame by the modem 204 and/or the preamble module 246.

Figure 4:
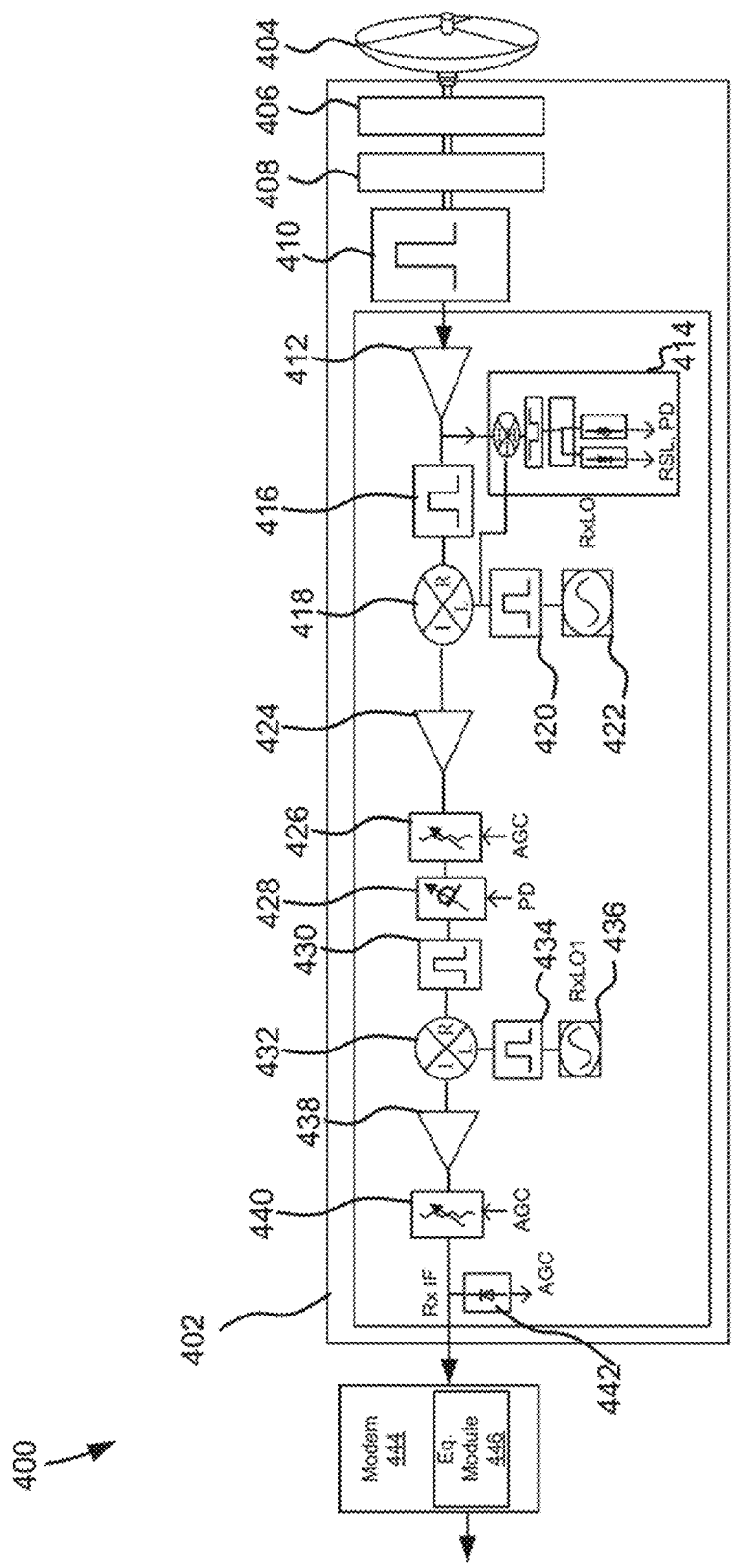
FIG. 4 is a block diagram of an example receiving radio frequency unit in some embodiments.

FIG. 4 is a block diagram 400 of an example receiving radio frequency unit 402 in some embodiments. In various embodiments, the receiving radio frequency unit 402 may receive the frame from the transmitting radio frequency unit 202 and perform frequency domain equalization utilizing an average at least some of the frequency points associated with the preamble from the frame in the frequency domain. The receiving radio frequency unit 402 may compare the averaged frequency points to an expected response (e.g., associated with a reference known sequence in the frequency domain) and generate (or select) one or more filters to apply to data in the signal to correct for nonlinear effects caused by the channel and/or components in the transmitter or receiver.

In various embodiments, dynamically controlled averaging of channel estimation in the frequency domain may be done by using high pass filter in frequency and time domain to determine level of variation (smoothness) in each domain and thus determine which low pass filter would be optimal. Alternatively, different low pass filters may be applied to the channel response in both frequency and time domain and influence on modem SNR and other metrics like forward error correction (FEC) statistics may be observed in order to select optimal filters for current conditions. In some embodiments, optimization algorithms may be used on filter coefficients in order to dynamically converge to optimal receiver performance.

For systems where the equalizer is used to correct mostly system design impairments and not the electromagnetic propagation channel, known properties of the system may be used to further improve averaging performance (this is for example the case in wireless point-to-point communication systems using frequencies above 13 GHz). Frequency response at the receiver can be determined by filters used in the system, which have known common characteristics, but the filters implemented with analog components have slight differences, so dynamic equalization is still needed. In such case, frequency response may first be normalized to average expected frequency response.

Results from described processes can be used also to estimate current conditions in communication systems, since they can determine if system is limited by white Gaussian noise or other expected or unexpected impairments. For example nonlinear distortions typically have impact on smoothness in frequency of estimated channel response, so output of high pass filter on channel estimation in frequency domain can be used as a measure of transmit Power Amplifier non-linear distortion, which can be used by ATPC (Automatic Transmit Power Control) or by Digital Pre Distortion (DPD) algorithms on transmit side. Results can also be used to detect abnormal system behavior in real time prior signal distorted to the point where it influences system performance, which can be used for example in protected systems.

In some embodiments, the receiving radio frequency unit 402 may receive redundant information in different polarizations. For example, the transmitting radio frequency unit 202 may transmit information on a horizontal polarization of a signal and redundant information on a vertical polarization of the signal. In some embodiments, the receiving radio frequency unit 402 may receive the signal and combine information contained in the different polarization.

Like the transmitting radio frequency unit 202, the receiving radio frequency unit 402 may include one or more processors and memory. Each of these components may be in communication, directly or indirectly, with each other (e.g., over one or more buses). In some embodiments, some components of receiving radio frequency unit 402 may be controlled and/or implemented with one or more application-specific integrated circuits (ASICs) adapted to perform some or all of the functions. In various embodiments, the functions may be performed by one or more other processing units (or cores), on one or more integrated circuits. It will be appreciated that other types of integrated circuits may be used (e.g., Field Programmable Gate Arrays (FPGAs) or Structured/Platform ASICs) which may be programmed.

The processor(s) may include a central processing unit (CPU), a microcontroller, an application-specific integrated circuit (ASIC), and/or the like. The memory may include random access memory (RAM) or read-only memory (ROM). The memory may store computer-readable, computer-executable instructions that are configured to, when executed, control any number of the one or more processor(s).

The antenna 404 and a diplexer 406 may be coupled to the waveguide 408. The waveguide 408 may provide the signal from the antenna 404 to the diplexer 406 via a waveguide filter 410. The waveguide filter 410 may provide the signal to the receiving radio frequency unit 402. In some embodiments, the receiving radio frequency unit 402 may comprise the waveguide, the waveguide filter, and/or the diplexer.

The waveguide 408 may be any waveguide kind or type of waveguide. For example, the waveguide 408 may be hollow or dielectric. In some embodiments, the waveguide 408 comprises a rectangular to circular waveguide. The waveguide filter 410 may be any filter coupled to the waveguide 408 and configured to filter the electromagnetic waves from the waveguide 408 (e.g., remove noise).

In various embodiments, the receiving radio frequency unit 402 is configured to receive a signal from the antenna 404 via the diplexer 406 and adjust the phase of the received signal. The phase of the received signal may be adjusted based on a comparison of the phase of the signal and a predetermined phase value. In some embodiments, the receiving radio frequency unit 402 may also be configured to adjust the gain of the received signal. In one example, the receiving radio frequency unit 402 may adjust the gain of the received signal based on a comparison of a gain of the received signal with a predetermined gain value.

The receiving radio frequency unit 402 may be any receiver including, but not limited to, a traditional heterodyne receiver with RX intermediate frequency (IF) output. It will be appreciated that multiple receiving radio frequency units may be used to receive the same signal (e.g., signals containing the same information provided by a wireless communication source). Each receiving radio frequency unit may adjust the phase of the received signal, respectively, based on the same predetermined phase value. Similarly, each receiving radio frequency unit may adjust the gain of the received signal, respectively, based on the same gain value. As a result, the phase and gain of the signal from each receiving radio frequency unit may be the same or substantially similar (e.g., the phase and gain of the signals may be identical). The signals may be subsequently combined to strengthen the signal, increase dynamic range, and/or more accurately reproduce the information that was wirelessly transmitted.

The receiving radio frequency unit 402 may comprise amplification/attenuation modules 412, 424, and 438, filter modules 416, 420, 430, and 434, mixer modules 418 and 432, oscillator modules 422 and 436, an optional phase control module, automatic gain control modules 426, 440, and 442, and variable phase module 428.

The amplification/attenuation modules 412, 424, and 438 may comprise an amplifier and/or an attenuator configured to amplify and/or attenuate a signal. The amplification/attenuator modules 412, 424, and 438 may be any kind of amplifiers and/or attenuators. Further, the amplification/attenuator modules 412, 424, and 438 may each comprise amplifiers and/or attenuators with any kind of electrical properties.

In some embodiments, the amplifier/attenuator module 412 receives a signal via the antenna 404. The amplifier/attenuator module 412 may be a low noise amplifier configured to amplify the signal (or components of the signal) before providing the signal to the filter module 416 and the phase control module 414. Further, the amplifier/attenuator module 424 may attenuate the signal (or components of the signal) after the signal has been downconverted by the mixer module 418, the filter module 420, and the oscillator module 422. The amplifier/attenuator module 424 may then provide the signal to the automatic gain control 426. The amplification/attenuator module 438 may attenuate the signal (or components of the signal) after the signal has been downconverted by the mixer 432, the filter module 434, and the oscillator module 436. The amplifier/attenuator module 438 may then provide the signal to the automatic gain control 440.

Those skilled in the art will appreciate that each of the amplifier/attenuator modules 412, 424, and 438 may be the same as one or more other amplifier/attenuator modules. For example, amplifier/attenuator modules 412 and 424 may both be amplifiers sharing the same electrical properties while amplifier/attenuator module 438 may be an attenuator. In another example, amplifier/attenuator modules 412 and 424 may both be amplifiers but have different electrical properties.

Each amplifier/attenuator module 412, 424, and 438 may include one or more components. For example, the amplifier/attenuator module 412 may comprise one or more amplifiers and/or attenuators.

The filter modules 416, 420, 430, and 434 may comprise filters configured to filter the signal. The filter modules 416, 420, 430, and 434 may comprise many different types of filters (e.g., bandpass filter, low pass filter, high pass filter, or the like) with many different electrical properties. In one example, the filter module 416 may be a band pass filter configured to filter the signal (or components of the signal) received from the amplification/attenuation module 412 before providing the signal to the mixer module 418. Similarly, filter modules 420, 430, and 434 may filter signals (or components of the signals) from the oscillator module 422, the phase adjuster 428, and the oscillator module 436, respectively.

Those skilled in the art will appreciate that each of the filter modules 416, 420, 430, and 434 may be the same as one or more other filter modules. For example, filters module 416 and 420 may both be filters sharing the same electrical properties while filter module 430 may be another kind of filter. In another example, filters module 416 and 420 may both be filters of a similar type but have different electrical properties.

Each filter modules 416, 420, 430, and 434 may include one or more components. For example, the filter modules 416 may comprise one or more filters.

The mixer modules 418 and 432 may comprise mixers configured to mix the signal received from the antenna with one or more other signals. The mixer modules 418 and 432 may comprise many different types of mixers with many different electrical properties. In one example, the mixer 418 mixes a signal received from the filter module 416 with the filtered oscillating signal from the filter module 420 and the oscillator module 422. In another example, the mixer module 432 mixes a signal received from the filter module 430 with the filtered oscillating signal from the filter module 434 and the oscillator module 436.

Those skilled in the art will appreciate that each of the mixer modules 418 and 432 may be the same as one or more other mixer modules. For example, mixer modules 418 and 432 may both be mixers sharing the same electrical properties or, alternately, the mixer modules 418 and 432 may be another kind of mixer and/or with different electrical properties.

Each mixer modules 418 and 432 may include one or more components. For example, the mixer module 418 may comprise one or more mixers.

The oscillator modules 422 and 436 may comprise oscillators configured to provide an oscillating signal that may be used to downconvert the signal received from the antenna with one or more other signals. The oscillator modules 422 and 436 may comprise any kind of oscillator with any different electrical properties. In one example, the oscillator module 422 provides an oscillating signal to the filter module 420. The oscillator module 436 may provide an oscillating signal to the filter module 434.

The oscillating modules 422 and 436, either individually or together, may be local or remote. In one example, the oscillating module 422 and/or the oscillating module 436 may be remotely located and configured to provide an oscillating signal to one or more receiving radio frequency units. In some embodiments, a single oscillating module may provide an oscillating signal to both the mixer module 418 and 432, respectively (e.g., optionally via a filter). In one example, the local oscillator signal from the oscillator module may be altered (e.g., oscillation increased or decreased) and provided to a different part of the circuit.

Those skilled in the art will appreciate that each of the oscillator modules 422 and 436 may be the same as each other. For example, oscillator modules 422 and 436 may both be oscillators sharing the same electrical properties or, alternately, the oscillator modules 422 and 436 may be another kind of oscillator and/or with different electrical properties.

Each oscillator modules 422 and 436 may include one or more components. For example, the oscillator module 422 may comprise one or more oscillators.

The phase control module 414 may be configured to generate a phase control signal to control the phase of a processed signal. In one example, the phase control module 414 receives the filtered signal from the amplifier/attenuator module 412 and mixes the amplified or attenuated signal with the filtered local oscillator or the downconverted signal from the first downconverter (e.g., mixer module 418, filter module 420, and oscillator module 422). The phase control module 414 may filter and compare the filtered, mixed signal with a predetermined phase value to generate a phase control signal based on the comparison. By mixing the oscillator signal with the sampled signal from the coupler prior to determining the phase of the signal, the frequency of the signal is reduced and lower priced components may be used in the phase control module 414.

In some embodiments, the phase control module 418 uses a coupling port in the same path as RSL. The coupling port may sample the signal. In some embodiments, the coupling port comprises a capacitive tap. In some embodiments, a preexisting transmitter may be modified to take advantage of one or more systems and methods described herein. In one example, the mixer and filter of the phase control module 418 is a part of the RSL functionality. A splitter may be used to split the signal between the RSL and a phase comparator (discussed herein). The phase comparator may generate the phase control signal based on a comparison of the phase of the signal from the mixer and a predetermined phase value.

In various embodiments, the coupling port for both input amplitude and phase can be coupled before the Rx LNA (e.g., low noise amplifier 412), after LNA 412, or after the $1^{st}$ down-conversion (e.g., via the mixer module 418, filter module 420, and the oscillator module 422), depending on, for example, requirements of cost and accuracy.

The phase control module 414 may comprise a variety of different components (e.g., a mixer, filter, splitter, and a comparison module). The phase control module 418 is further described with regard to FIG. 8 herein. In various embodiments, one phase control module 414 may receive signals from a plurality of different receiving radio frequency units and provide phase control signals to one or more of the different receiving radio frequency units.

The automatic gain control modules 426, 440, and 442 may comprise automatic gain control (AGC) circuits configured to increase or decrease the gain of the signal received from the antenna 404 with one or more other signals. The automatic gain control modules 426, 440, and 442 may comprise many different types of AGCs with many different electrical properties. In one example, the automatic gain control module 426 increases or decreases the gain of the signal received from the amplifier/attenuator module 424. The automatic gain control module 426 may adjust the gain of the signal based on a gain control signal. Similarly, the automatic gain control module 440 increases or decreases the gain of the signal received from the amplifier/attenuator module 438. In some embodiments, the automatic gain control module 440 may increase or decrease the gain of the signal based on a gain control signal. The automatic gain control module 442 may also increase or decrease the gain of the signal received from the automatic gain control module 440 and/or generate the gain control signal. In some embodiments, the automatic gain control module 442 may compare the amplification of the signal from the automatic gain control module 440 to a predetermined gain value and generate the gain control signal based on the comparison. The gain control signal may control the automatic gain control module 426 and/or the automatic gain control module 440.

Those skilled in the art will appreciate that each of the automatic gain control modules 426, 440, and 442 may be the same as one or more other automatic gain control modules. For example, automatic gain control modules 426 and 440 may both be AGCs sharing the same electrical properties or, alternatively, the automatic gain control modules 426 and 440 may be another kind of AGC and/or with different electrical properties.

Each automatic gain control modules 426, 440, and 442 may include one or more components. For example, the automatic gain control module 426 may comprise one or more AGCs.

The phase adjuster 428 may comprise a variable phase control circuit configured to increase or decrease the phase of the signal received from the antenna 404. The phase adjuster 428 may comprise any different type of phase adjuster with different electrical properties. In one example, the phase adjuster 428 increases or decreases the phase of the signal received from the automatic gain control module 426. The phase adjuster 428 may adjust the phase of the signal based on a phase control signal from the phase control module 414.

The phase adjuster 428 may include one or more components. For example, the phase adjuster 428 may comprise one or more phase control elements.

The receiving radio frequency unit 402 may be coupled to a modem 444 with an equalization module 446. The modem 444 is configured to demodulate the signal received from the receiving radio frequency unit 402.

In various embodiments, the modem 444 may include an equalization module 446. The equalization module 446 is configured to perform frequency domain equalization using averages of groups of neighboring frequency points associated with the preamble in the frequency domain to adjust data transmitted from the transmitting radio frequency unit to reduce or eliminate noise caused by nonlinear changes to the signal (e.g., nonlinear noise caused by components of the transmitting radio frequency unit 202, the receiving radio frequency unit 402, and/or the channel between them). The equalization module 446 is further discussed regarding FIGS. 5 and 6.

As discussed herein, the equalization module 446 may remove the cyclic prefix from the signal, retrieve the preamble, transform the preamble into the frequency domain, and average a predetermined number of frequency points associated with a preamble in the frequency domain to reduce or eliminate errors that can be caused by nonlinear noise. The equalization module 446 may compare the averaged frequency points associated with the received preamble to an expected response. The expected response may be a response of a reference preamble. The reference preamble (e.g., a reference known sequence) may be the same preamble as that which was added by the transmitting radio frequency unit 202. In some embodiments, the reference preamble includes expected averages of groups of neighboring points for comparison with the averaged groups of frequency points associated with the preamble retrieved from the transmitted signal. The equalization module 446 may, based on the comparison, generate or select any number of filters to apply to the data from the signal in the frequency domain to correct for the nonlinear noise. For example, the equalization module 446 may generate or select a filter that is the inverse of a difference between the averaged frequency points associated with the preamble and the expected response. The filter may be applied to data from the signal in the frequency domain to correct for nonlinear and/or linear noise.

In some embodiments, by averaging frequency points in the frequency domain, there may be compromise between resolution and frequency (e.g., there are fewer points in the frequency domain with which to perform frequency response estimation). However, since the transmission of signals between the transmitting radio frequency unit 202 and the receiving radio frequency unit 402 may not have multipath reflections (e.g., they units may be a part of a line of sight system), changes in signal transmission over the channel may be limited. The fact that changes occur more slowly than in multipath reflection systems may be leveraged to reduce or correct nonlinear noise without significant comprises between resolution and frequency.

It will be appreciated that information associated with the channel estimation may be utilized for corrections or adjustments in the time domain. Examples are discussed herein.

Figure 5:
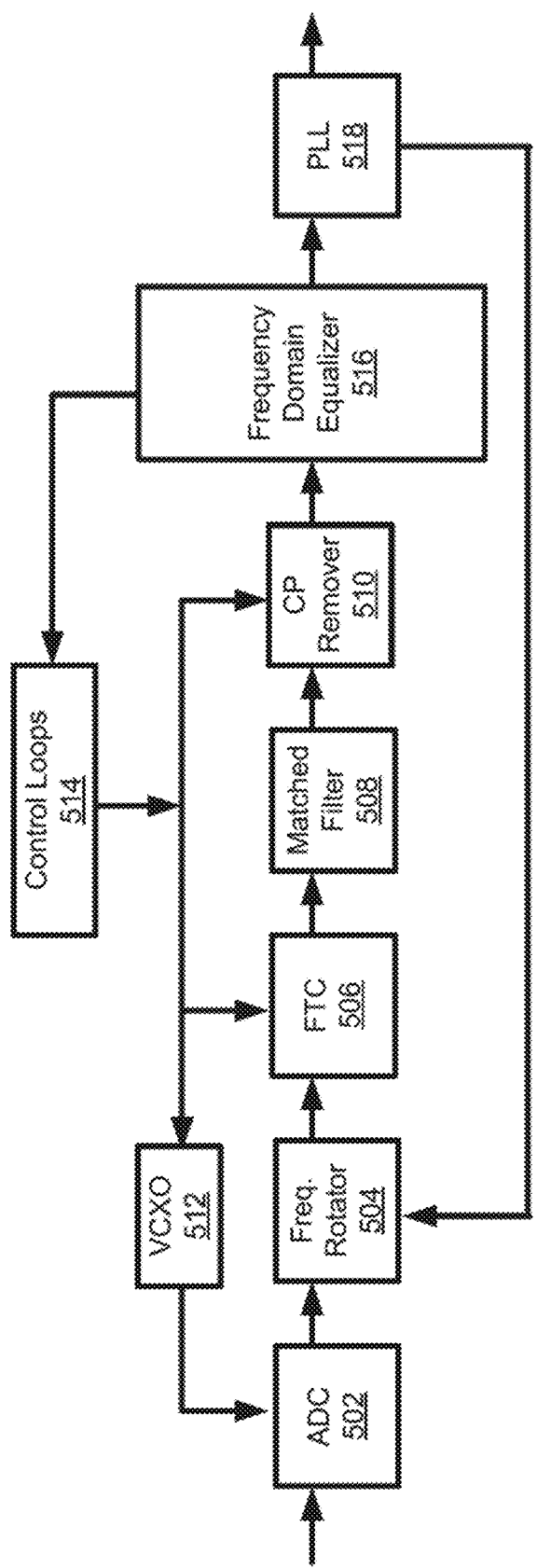
FIG. 5 shows an example equalization module in some embodiments.

FIG. 5 shows an example equalization module 500 in some embodiments. The equalization module 500 may comprise an analog-to-digital converter (ADC) 502, a frequency rotator 504, a fine timing filter (FTC) 506, a matched filter 508, a CP removal 510, a voltage-controlled crystal oscillator (VXCO) 512, a frequency domain equalizer 516, a phase locked loop (PLL) 518, and a control loop module 514. The equalization module 500 may be the equalization module 446 depicted in FIG. 4.

As discussed herein, the equalization module 500 may perform frequency domain equalization using the preamble retrieved from a portion of the signal received by the receiving radio frequency unit 402. The equalization module 500 may average groups of a predetermined number of frequency points of the preamble in the frequency domain, and compare the averages to an expected frequency response associated with a reference preamble. The equalization module 500 may generate a correction signal based on the comparison of the average and the expected response to generate or select a filter to adjust data from the signal in the frequency domain.

The equalization module 500 may average any number of the frequency points of the preamble in the frequency domain to create any number of averages. The calculated average(s) may be compared to any number of expected responses associated with any number of frequencies. In some embodiments, the equalization module 500 may average two, three, five, seven, nine, or any number of frequency points associate with the preamble in the frequency domain. For example, the equalization module 500 may transform the preamble into the frequency domain utilizing a Fourier transform (e.g., FFT). The equalization module 500 may average a predetermined number of neighboring frequency points (e.g., every seven neighboring frequency points) associated with the preamble in the frequency domain. In one example, every seven neighboring frequency points which are not part of a previous averaging may be averaged by the equalization module 500. In another example, a frequency point may be averaged with several other groups of frequency points. For example, assuming 256 frequency points (each frequency point being associated with a number in ascending order), the third frequency point may be averaged with frequency points {1, 2, 4, 5, 6, 7}, {2, 4, 5, 6, 7, 8}, and {4, 5, 6, 7, 8, 9}. It will be appreciated that each frequency point associated with the preamble may be grouped with other frequency points in the frequency domain in any number of ways.

Then number of frequency points averaged by the equalization module 500 may be predetermined. In some embodiments, the equalization module 500 may be preconfigured to average a predetermined number of frequency points. In various embodiments, the equalization module may dynamically change the number of frequency points to be averaged. For example, the equalization module 500 may determine the number of frequency points to average in the frequency domain based on an SNR ratio and/or any other measurement of the signal. For example, the equalization module 500 may include a table indicating a number of frequency points to average in the frequency domain based on a detected SNR ratio and/or other measurement of one or more signals received by the receiving radio frequency unit 402.

In various embodiments, the equalization module 500 may change the number of frequency points to average in the frequency domain over time. For example, the equalization module 500 may detect changes in phase, an SNR ratio, or other measurement after applying corrections to data in the signal. The equalization module 500 may change the number of frequency points upon detection of sufficient improvement, detection of insufficient improvement, or if the equalization module 500 detects that there is increased noise or errors.

It will be appreciated that while the equalization module 500 is described as averaging any number of frequency points, the equalization module 500 may perform any arithmetic mean, median, or mode. In some embodiments, the equalization module 500 may perform any statistical function(s) in addition to or instead of averaging.

The equalization module 500 may generate or select any number of filters to adjust all or some of the data received by the receiving radio frequency unit (e.g., adjust a portion of the signal until the next preamble is received). In various embodiments, the equalization module 446 may select any number of equalization filters based on the correction signal (e.g., the correction signal being based on the comparison of the calculated average of frequency points associated with the received preamble and the expected response). There may be any number of predefined equalization filters associated with any number of correction signal(s) or ranges of correction signals.

After applying a predefined equalization filter to the signal received by the receiving radio frequency unit 402, the equalization module 446 may determine a signal-to-noise (SNR) ratio and/or any other measurement(s) to determine an improvement. The SNR ratio and/or any other measurement(s) may be compared to measurement thresholds. If, based on the comparison to the measurement thresholds, it is determined that there is insufficient improvement, the equalization module 446 may select one or more different predefined equalization filters (e.g., based on the signal correction) to apply to the data of the signal and determine a new SNR ratio and/or any other measurements to re-compare to the measurement thresholds to determine improvement. It will be appreciated that the processing of applying any number of predefined equalization filter(s) and testing the improvement may continue until improvement is satisfactory (e.g., based on the measurement thresholds), a predetermined period of time has elapsed, and/or a new preamble is received and new adjustments made based on new equalization.

In some embodiments, the ADC 502 samples the analog signal received by the receiving radio frequency unit to convert the analog signal to a digital signal. In various embodiments, the signal may be buffered to form a frequency domain equalization (FDE) block. The last symbols (referred to as the CP of the block) may be concatenated cyclically to the header. The digital signal may be processed through various blocks before having a CP removed from each FDE block of the signal at the CP remover 510.

The frequency domain equalizer 516 may be configured to perform frequency equalization on a FDE block. As discussed herein, the frequency domain equalizer 516 may perform equalization in the frequency domain. Although equalization is discussed in the frequency domain, it will be appreciated that equalization may occur in the time domain as well. In some embodiments, the frequency domain equalizer 516 may apply an equalizer in the frequency domain to the FDE blocks and then combine the equalized spatially multiplexed signals in the time domain to effectuate spatial equalization.

The frequency domain equalizer 516 may process the FDE block on a block-by-block basis. In some embodiments, the frequency domain equalizer 516 may transform the symbols (e.g., through a fast Fourier transform (FFT) engine). The frequency domain equalizer 516 may perform channel estimation and equalization. Channel estimation may be performed using the preamble of the FDE-block, with the result of the channel estimation being used for the entire FDE-block. Frequency domain equalization on the data portion of the FDE-block may be accomplished using the channel estimation (from channel estimation resolution to data symbol resolution). After equalization, the IFFT may be performed to produce equalized time domain samples.

The frequency domain equalizer 516 may determine a Sample Time Offset (STO) and Carrier to Interference-plus-Noise Ratio (CINR). These estimates may be derived, at least in part, from the preamble.

Subsequently, the PLL 518 may perform phase recovery in the time domain.

The control loops module 514 may acquire a source sampling clock frequency and filter the clock source phase noise to provide to the ADC 502 (e.g., utilizing the VCXO 512). For example, the control loops module 514 may be responsive to the STO for a single preamble. The control loops module 514 may also be operative to adjust a sample time associated with the incoming signal in the time domain, based at least in part, on the STO. For example, the control loops module 514 may generate a sampling time correction to provide to the VCXO 512. The VCXO 512 may generate the clocks for the ADC 502 and receive pipeline (including the FTC 506 and tunable CP remover 510). In this manner, a closed timing loop may be implemented.

Detecting a phase error in the frequency equalized incoming signal output from the frequency domain equalizer 516, and then rotating the phase of the incoming signal, pre-frequency domain processing may correct phase error. This may be accomplished using a phase noise suppression module such as the PLL 518 and the phase rotator circuitry 504.

The PLL 518 may be configured to detect the phase error in the frequency equalized incoming signal output by the frequency domain processor. In some embodiments, the PLL 518 may operate as a digital PLL (DPLL) for tracking the phase noise introduced by radio frequency (RF) synthesizers. The PLL 518 may also estimate the long term frequency error and track its offset (e.g., due to slow variations with temperature change). In some embodiments, phase noise may be detected on a sample-by-sample basis.

The PLL 518 may begin its phase error detection in an acquisition mode (e.g., based on a pilot sequence of an FDE-block preamble), pilots embedded in the data, or another known sequence. The PLL 518 may switch to a tracking mode when it obtains a phase error "lock" (e.g., when the phase error is below a defined threshold). In some embodiments, the PLL 518 may utilize a second order loop to enable frequency tracking with no tracking error.

When operating as a DPLL, the PLL 518 may evaluate detected phase error of the corrected signal received at its input and calculate a phase/rotation for correction of samples output from the ADC 504. The correction may then applied to the samples output from the ADC 504 using the phase rotator circuitry 504 disposed before the frequency domain equalizer 516. Because the signal received by the PLL 518 may not be continuous in time (due to removal of the CP for each FDE-block), an educated phase jump may be made. For example, when a new block of contiguous symbols begins, the initial phase for the block may be calculated according to the length of the gap left by CP removal and the last known frequency state of the PLL 518.

In some embodiments, the frequency domain processor 530 may be implemented using a digital signal processor (DSP), whereas the transitions between time and frequency domains may be performed using hardware (HW) co-processors, thereby unloading some of the processing complexity from the DSP to the hardware co-processors.

The matched filter 508 may include any number of filters to adjust the digital signal. In some embodiments, the matched filter 508 attenuates or amplifies signals received by the receiving radio frequency unit to correct for inherent properties of hardware of the receiving radio frequency unit 402 and/or the transmitting radio frequency unit 202. For example, because properties of the receiving radio frequency unit 402 may be known, the matched filter 508 and/or other filters may improve the signal. The matched filter 508 may be constructed and/or configured to adjust the signal(s) based on the hardware components. For example, different frequencies may be more attenuated because other filters in the receiving radio frequency unit may cut the signal at the edge. A filter such as a 256 MHz bandwidth filter, for example, may attenuate the signal at the edge of the bandwidth. The matched filter 508 may be constructed to multiply the response of the signal, for example, by the inverse of the undesired attenuation to improve the response of the signal to improve the flatness of frequency response in the frequency domain.

Figure 6:
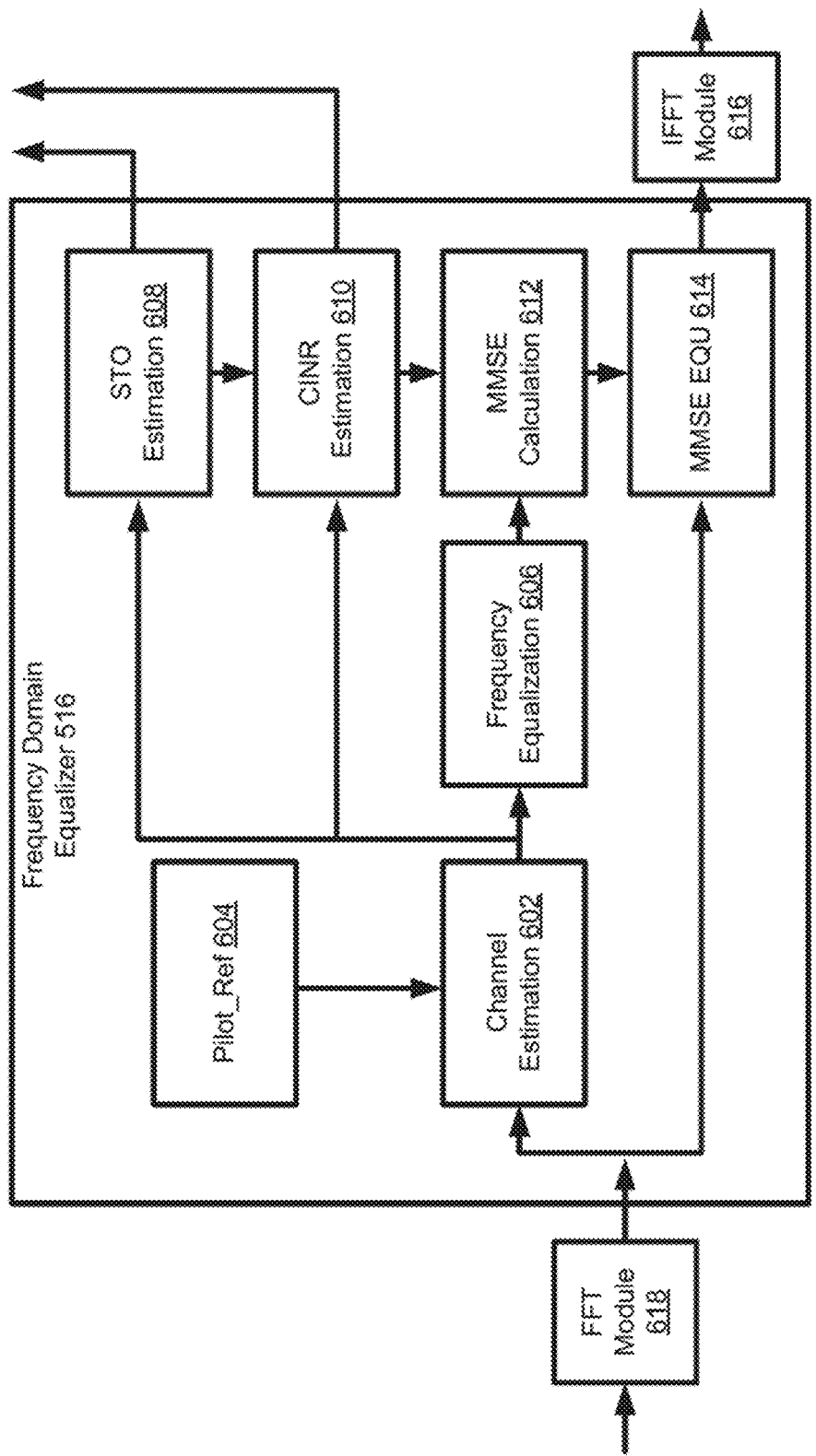
FIG. 6 shows an example frequency domain equalizer in some embodiments.

FIG. 6 shows an example frequency domain equalizer 516 in some embodiments. The frequency domain equalizer 516 may include one or more processors and memory. For example, the frequency domain equalizer 516 may include and/or control one or more processors (e.g., ASICs) to perform any number of functions. Memory may include any computer readable media. In some embodiments, the memory may include non-transitive computer readable media.

The example frequency domain equalizer 516 may comprise two branches. The first branch may determine a correction to apply to data in the signal based on frequency domain equalization. The second branch may apply the correction to data contained in the signal received by the receiving radio frequency unit in the frequency domain.

In some embodiments, frequency domain equalization coefficients may be determined from the preamble (or other known sequence) of an FDE block transmitted ahead of the data in the FDE block. A preamble-based CSC implementation may be utilized to derive channel and system statistics, such as Signal to Noise Ratio, interferences between polarizations, CNR, RSSI (Received Signal Strength Indication), and the like.

In one example, the equalization module 446 may receive an FDE-block. The CP remover module 510 of FIG. 5 may perform CP removal. The frequency domain equalizer 516 may include an FFT module 618 to transform the preamble to frequency points in the frequency domain utilizing a Fourier transform (e.g., FFT). The frequency domain symbols output therefrom may be stored (e.g., in buffers of memory).

The channel estimation module 602 may read the preamble symbols of the FDE-block (e.g., from buffers in memory) and generate a channel estimation. For example, the channel estimation module 602 may compare frequency points of the preamble to an expected frequency response of the preamble (e.g., received from the pilot reference module 604).

In various embodiments, the frequency equalization module 606 may average a predetermined number of frequency points associated with the preamble. As discussed herein, the frequency equalization module 606 may average any number of frequency points. Averaging may correct errors caused by IQ imbalance. It will be appreciated that just 1% or 2% of phase error in the frequency domain is not the same error in each component. By averaging a predetermined number of frequency points in the frequency domain (e.g., seven or ten neighboring frequency points), accuracy may be improved.

In some embodiments, the system of averaging a predetermined number of frequency points associated with the preamble relies on the fact that the frequency response of the system is smooth and changes slowly (e.g., because the system does not have multipath reflections and/or may be line of sight).

In various embodiments, the frequency equalization module 606 may determine the whether or not to average frequency points associated with the preamble. For example, the frequency domain equalizer 516, the equalization module 446, and/or the modem may determine if there is phase gain error or other indication of imbalance in the signal. The frequency domain equalizer 516, the equalization module 446, and/or the modem may comprise an imbalance detection module (e.g., not depicted) that may determine if the phase gain error and/or other indication of imbalance in the signal is too high (e.g., the phase gain error and/or other indication of imbalance in the signal exceeds a predetermined imbalance threshold).

If the phase gain error and/or other indication of imbalance in the signal is not too high, the frequency domain equalizer 516 may not average any of the frequency points associated with the preamble. Alternately, if the phase gain error and/or other indication of imbalance in the signal is too high, the frequency domain equalizer 516 may average a predetermined number of frequency point. In various embodiments, the frequency domain equalizer 516 may determine the number of frequency points associated with the preamble to average in the frequency domain based on the phase gain error and/or other indication of imbalance. For example, a table that associates a different predetermined number of points to average with the phase gain error and/or other indication of imbalance (e.g., the table associates a greater number of frequency points to average based on the greater the phase gain error and/or other indication of imbalance over the threshold).

It will be appreciated that the frequency equalization module 606 may, in some embodiments, average any number of frequency points associated with the preamble and provide the averages to the channel estimation module 602 for frequency estimation of the channel.

The sample time offset (STO) estimation module 608 may estimate the STO of an FDE-block based on its preamble symbols (e.g., using a least squares algorithm). The CINR estimation module 610 may estimate the CINR, $G^2$, of an FDE-block based on its preamble symbols.

In the example depicted in FIG. 6, the frequency domain equalizer 516 may utilize a minimum mean squared error (MMSE) equalization technique. It will be appreciated that the frequency domain equalizer 516 may utilize any equalization technique. The MMSE calculation module 612 may perform a mean square error estimation based on the channel estimation and the CINR estimation, $G^2$. The channel used for MIVISE calculation may be averaged between consecutive preambles to reduce the noise floor. The result of the MIVISE calculation may be an MIVISE matrix specifying frequency domain equalization coefficients. These coefficients may be used by the MMSE equalizer 614 to perform frequency domain equalization on the data symbols of an FDE-block (e.g., retrieved from buffers in memory). It will be appreciated that the MMSE calculation module 612 is optional in some embodiments.

In various embodiments, the frequency equalization module 606, MIVISE equalization module 614 and/or MMSE calculation module 612 may weigh past calculations based on previously received preambles into account. For example, the frequency equalization module 606, MIVISE equalization module 614 and/or MIVISE calculation module 612 may calculate a correction to coefficients based on the most currently received preamble. The correction may be combined with one or more previously calculated corrections which were calculated based on previously received preambles. For example, the current correction to coefficients may be calculated utilizing 10% of the frequency equalization associated with the most recently received preamble and 90% of the frequency equalization associated with one or more of the previously received preambles.

An IFFT module 616 may be used to perform an inverse Fourier transform (e.g., IFFT) to transform the corrected data to the time domain for subsequent time domain processing. In various embodiments, the IFFT module 616 may further include a signal quality test module configured to test SNR, CNR, or other measurements. The signal quality test module may command the frequency domain equalizer 516 to select or generate other filters to apply to the data (e.g., by the MMSE equalization module 614) and/or apply averaging using a different number of frequency points in the frequency domain to improve signal quality (e.g., improve SNR, CNR, or other measurements).

Figure 7:
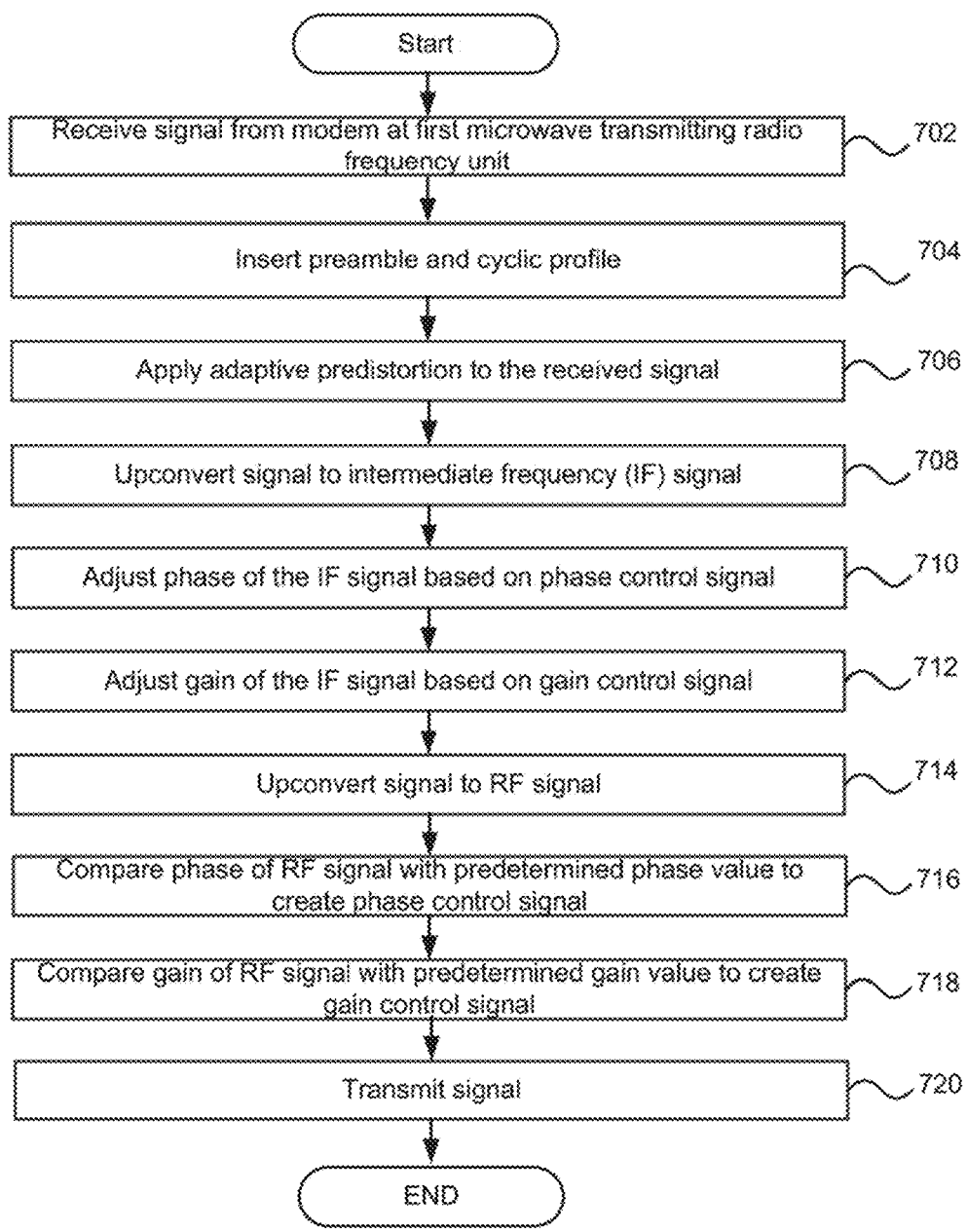
FIG. 7 is a flow chart of an example method for inserting the preamble in data to be transmitted and transmitting the signal in some embodiments.

FIG. 7 is a flow chart of an example method for inserting the preamble in data to be transmitted and transmitting the signal in some embodiments. In step 702, a modem 204 of the transmitting radio frequency unit 202 receives data from a digital device (customer equipment). A digital device is any device with memory and at least one processor.

In step 704, the preamble module 246 may insert the preamble and the cyclic profile into a frame to provide to the receiving radio frequency unit 402. As discussed herein, the preamble is any known sequence and can be any number of symbols. The modem 204 may provide provides I and Q signals to the predistortion module 206. In some embodiments, the modem 204 receives a single signal that is not divided into I and Q signals. It will be appreciated that the modem may receive any number of signals (e.g., not only I or Q signals).

In step 706, the predistortion module 206 may apply adaptive predistortion to the signals from the modem 204. The applied adaptive predistortion may be based, at least in part, the predistortion control signal provided by the adaptive module 208. The predistortion module 206 may apply the adaptive predistortion to increase linearity of the system. In various embodiments, the predistortion module 206 and the adaptive module 208 are optional (e.g., when only a single signal is received from the modem 204 and not I and Q signals).

In step 708, the first upconverter (e.g., mixer module 210, filter module 212, and oscillator module 214) upconverts the signal from the predistortion module 206 to an intermediate frequency (IF) signal. In one example, the oscillator module 214 provides an oscillator signal which is filtered by the filter module 212 and then mixed with the signal from the predistortion module 206.

In step 710, the phase adjuster 218 adjusts the phase of the IF signal. In various embodiments, the phase adjuster 218 is controlled by a phase control signal from the signal quality control module 234. The phase adjuster 218 may be a phase shifter or any other element configured to alter the phase of the signal. In some embodiments, the phase of the signal may be adjusted at any point in the circuit of transmitting radio frequency unit 202.

In step 712, the AGC module 220 adjusts the gain of the IF signal. In various embodiments, the AGC module 220 is controlled by a gain control signal (i.e., the AD signal) from the signal quality control module 234. The AGC module 220 may be any element configured to alter the gain of the signal. Those skilled in the art will appreciate that the gain of the signal may be adjusted at any point in the circuit of transmitting radio frequency unit 202.

In step 714, the second upconverter (e.g., mixer module 224, filter module 226, and oscillator module 228) upconverts the signal from the amplifier/attenuator module 222 to a radio frequency (RF) signal. The RF signal may be in the microwave frequency range. In one example, the oscillator module 228 provides an oscillator signal which is filtered by the filter module 226 and then mixed with the signal from the amplifier/attenuator module 222. The upconverted RF signal may be amplified by a power amplifier such as amplifier/attenuator 232.

In step 716, the signal quality control module 234 compares the phase of the RF signal to a predetermined phase value and creates a phase control signal based on the comparison. The signal quality control module 234 may control the phase adjuster 218 as discussed with regard to step 710. The predetermined phase value may be based on the characteristics of one or more transmitters and/or the signal to be adjusted.

In step 718, the signal quality control module 234 compares the gain of the RF signal to a predetermined gain value and creates a gain control signal based on the comparison. The signal quality control module 234 may control the AGC module 220 as discussed with regard to step 712. The predetermined gain value may be based on the characteristics of one or more transmitters and/or the signal to be adjusted.

In step 720, an antenna may transmit the signal (e.g., received from the waveguide filter 242 and waveguide 244).

Figure 8:
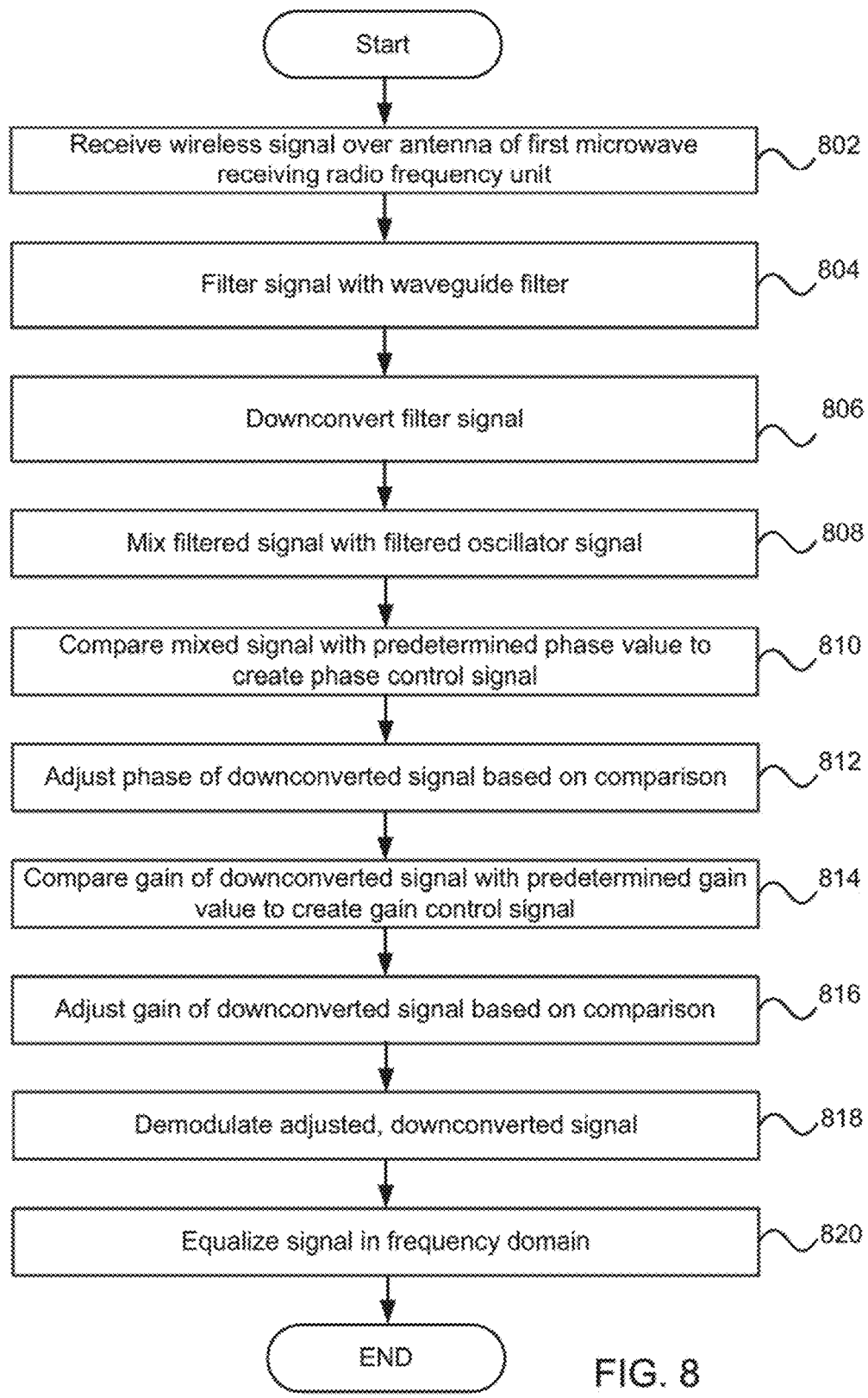
FIG. 8 is a flow chart of an example method for receiving a signal by a receiving radio frequency unit in some embodiments.
Figure 9:
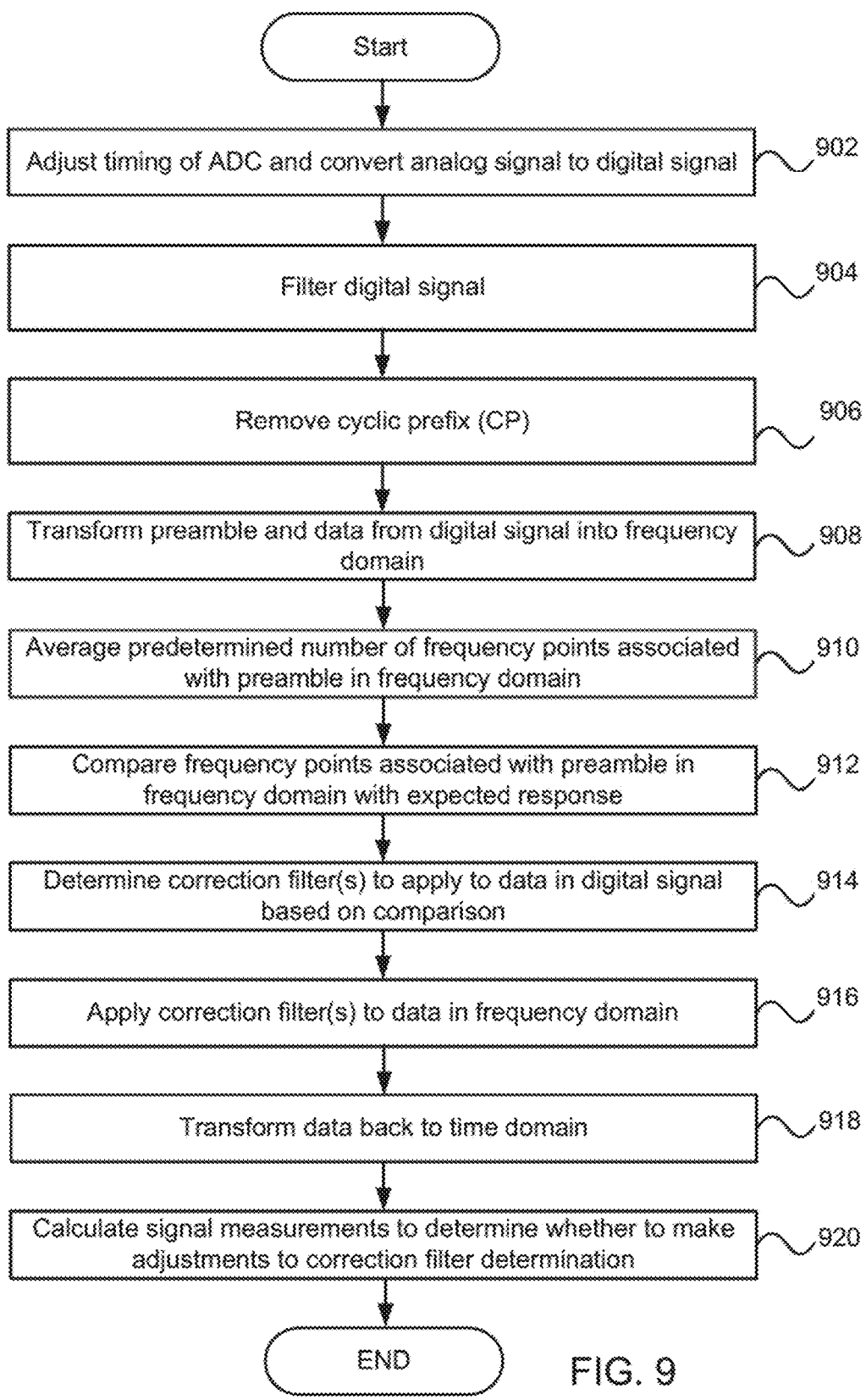
FIG. 9 is a flow chart of an example method for frequency domain equalization using averages of frequency points associated with the preamble in the frequency domain in some embodiments.

FIG. 8 is a flow chart of an example method for receiving a signal by a receiving radio frequency unit 402 in some embodiments. The discussion regarding FIG. 8 will focus on receiving and processing the signal by the receiving radio frequency unit 402. FIG. 9 is directed toward equalization of the signal in the frequency domain.

In step 802, an antenna 404 receives a wireless signal and provides the signal to the receiving radio frequency unit 402. In some embodiments, the electromagnetic wave energy of the wireless signal propagates through a waveguide coupled to the antenna 404 and is subsequently filtered with a waveguide filter 410 in step 804 before being provided to the receiving radio frequency unit 402 via the diplexer 406. In various embodiments, the waveguide 408, the waveguide filter 410, and/or the diplexer 406 are optional.

In step 806, the first downconverter module (e.g., the mixer module 418, the filter module 420, and/or the oscillator module 422) downconverts the signal from the diplexer 406 (received via the low noise amplifier 412). In some embodiments, the first downconverter module downconverts the signal to an intermediate frequency (IF) signal.

In step 808, the phase control module 414 mixes the signal from the antenna 404 (e.g., provided by the amplifier/attenuator module 412) with the filtered oscillator signal (e.g., filtered by filter module 420 and the oscillator module provided by the oscillator module 422) from the first downconverter module. The phase control module 414 then compares the phase of the mixed signal to a predetermined phase value in step 810. In various embodiments, the predetermined phase value is set based on the characteristics of one or more receivers and/or the signal to be adjusted.

In step 812, the phase adjuster 428 may adjust the phase of the downconverted signal (e.g., received from the AGC module 426) based on the comparison (e.g., based on a phase control signal from the phase control module 414). In some embodiments, the phase of the signal may be adjusted at any point in the circuit of receiving radio frequency unit 402.

In step 814, the AGC 442 compares the gain of the downconverted module from the second downconverter (e.g., the mixer module 432, the filter module 434, and the oscillator module 436) with a predetermined gain value to create a gain control signal. The predetermined gain value may be based on the characteristics of one or more receivers and/or the signal to be adjusted.

In step 816, the AGC module 426 adjusts the signal from the amplifier/attenuator 424 based on the gain control signal from the AGC 442. Those skilled in the art will appreciate that the gain of the signal may be adjusted at any point in the circuit of receiving radio frequency unit 402.

In step 818, the modem 444 demodulates the signal. In step 820, the equalization module 446 of the modem 444 equalizes the signal in the frequency domain with frequency domain equalization. Step 820 is further discussed regarding FIG. 9.

FIG. 9 is a flow chart of an example method for frequency domain equalization using averages of frequency points associated with the preamble in the frequency domain in some embodiments. In step 902, the PLL 518 and the control loops module 514 adjust timing of ADC 502 to convert an analog signal received by the receiving radio frequency unit 402 to a digital signal. In various embodiments, the PLL 518 may control the frequency rotator 504 to rotate the phase of the incoming signal to correct at least a portion of the phase error.

In optional step 904, one or more filters adjust the digital signal to correct imperfections caused by hardware of the receiving radio frequency unit 402 and/or transmitting radio frequency unit 202. In some embodiments, the matched filter 508 or any other filter may include any number of filters to adjust the digital signal. In some embodiments, the filter(s) attenuate or amplif(ies) signals received by the receiving radio frequency unit 402 to correct for inherent properties of hardware of the receiving radio frequency unit 402 and/or the transmitting radio frequency unit 202. Because properties of the receiving radio frequency unit 402 may be known, the matched filter 508 and/or other filters may be configured to improve the signal. The matched filter 508 may be constructed and/or configured to adjust the signal(s) based on the hardware components.

In step 906, the CP remover 510 removes the cyclic prefix. In some embodiments, removal of the CP may yield ISI-free symbols.

In step 908, the FFT Module 618 transforms the preamble and the data from the digital signal into the frequency domain. Although the FFT module 618 in this example performs a Fast Fourier Transform (FFT), it will be appreciated that any transform(s) may be utilize to transform the preamble and/or data into the frequency domain.

In step 910, the frequency equalization module 606 may average a predetermined number of frequency points associated with the preamble in the frequency domain. For example, the frequency equalization module 606 may average a predetermined number of neighboring frequency points to reduce or limit the effect of nonlinear changes (e.g., IQ imbalance) in the signal.

In some embodiments, the frequency equalization module 606 may determine the number of frequency points based on a detection of nonlinear noise, determine SNR, determine CNR, or determine any other measurement. For example, the frequency equalization module 606 may comprise a measurement module (not depicted) which is configured to detect noise, detect nonlinear noise, determine SNR, determine CNR, or determine any other measurement. The frequency domain equalizer 516 may, based on the detected noise or determine measurements from the measurement module, determine a number of frequency points to average in the frequency domain. It will be appreciated that the frequency domain equalizer 516 may dynamically a number of neighboring frequency points in the frequency domain to average based on any number of factors including, but not limited to, testing of the signal before frequency equalization, testing of the signal after frequency equalization, or any other factors.

In step 912, once a predetermined number of frequency points associated with the preamble are averaged, the frequency equalization module 606 may compare the calculated result to an expected frequency response of a pilot reference signal (e.g., a preamble that is similar to that which the transmitting radio frequency unit 202 added to the signal).

In some embodiments, the frequency equalization module 606 may generate a correction signal based on the comparison. The correction signal may indicate the difference between the calculated average of frequency points and the expected frequency response. In some embodiments, the correction signal may indicate the inverse of the difference between the calculated average of frequency points and the expected frequency response. In various embodiments, the correction signal is generated based on a comparison of a threshold (i.e., a differentiation threshold) and the difference between the calculated average of frequency points and the expected frequency response. The generation of the correction signal may be optional.

In step 914, the frequency equalization module 606 may determine one or more correction filter(s) to apply to the data in the digital signal based on the comparison. In some embodiments, the equalization module 446 may dynamically generate one or more filters to apply to data transmitted from the transmitting radio frequency unit.

The equalization module 446 may generate equalization filter(s) based on the comparison of the calculated result of averaged frequency points to the expected frequency response (e.g., the generation of the filter(s) may be based on the correction signal). In some embodiments, the equalization filter is the inverse of the difference between the averaged frequency points and the expected frequency response of the pilot signals (e.g., a known sequence that is the same as the preamble that was inserted by the transmitting radio frequency unit 202).

In some embodiments, the equalization module 446 may select equalization filter(s) based on the comparison of the calculated result of averaged frequency points to the expected frequency response (e.g., the selection of the filter(s) may be based on the correction signal). In some embodiments, there may be any number of previously defined filters. The equalization module 446 may retrieve a table (or any data structure) in memory that correlates one or more filters to ranges of the difference in frequency response between the calculated result of averaged frequency points and the expected frequency response. The equalization module 446 may select different correction filters based on the table.

In step 916, the MIVISE Equalizer 614 may apply the determined correction filter(s) to the data in the frequency domain. In step 918, the IFFT module 616 may transform the equalized data back from the frequency domain to the time domain. The IFFT module 616 may apply an inverse of the transform applied by the FFT module 618. Further adjustments (e.g., to timing) and/or equalization of the data may be performed in the time domain. In some timing adjustments and/or equalization of the data may be performed in the time domain based, in part, on information from the frequency domain equalizer 516 (e.g., based on the channel estimation, STO estimation, CINR estimation, and/or the like).

In optional step 920, a signal quality test module (not pictured) may be configured to determine SNR, CNR, or other measurements of the signal to determine whether to make adjustments to the correction filter determination. The signal quality test module may compare the SNR, CNR, and/or other measurements to any number of signal quality thresholds to determine whether a different correction filter should be generated or selected.

If the SNR, CNR, and/or other measurements exceed one or more signal quality threshold(s), the signal quality test module may command the frequency domain equalizer 516 to select or generate one or more other correction filters to apply to the data (e.g., by the MIVISE equalization module 614) and/or apply averaging using a different number of frequency points in the frequency domain to improve signal quality (e.g., improve SNR, CNR, or other measurements).

Figure 10:
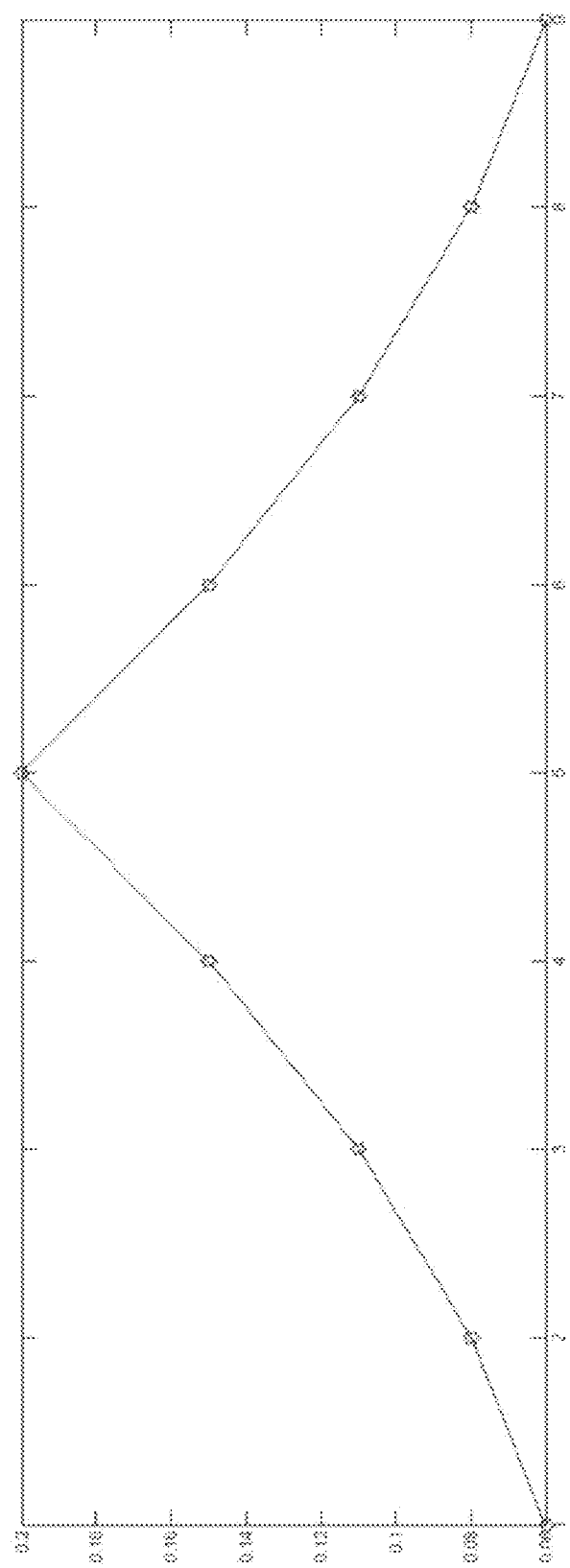
FIG. 10 is a graph of a frequency response smoothing filter in some embodiments.

FIG. 10 is a graph of a frequency response smoothing filter in some embodiments. The frequency response smoothing filter as depicted in FIG. 10 includes nine coefficients, the middle coefficient being higher valued. The sum of the coefficients is 1. In some embodiments, the frequency response smoothing filter is a correction filter generated by the frequency equalization module 606 and applied to data in the frequency domain by the MMSE equalizer 614.

Figure 11:
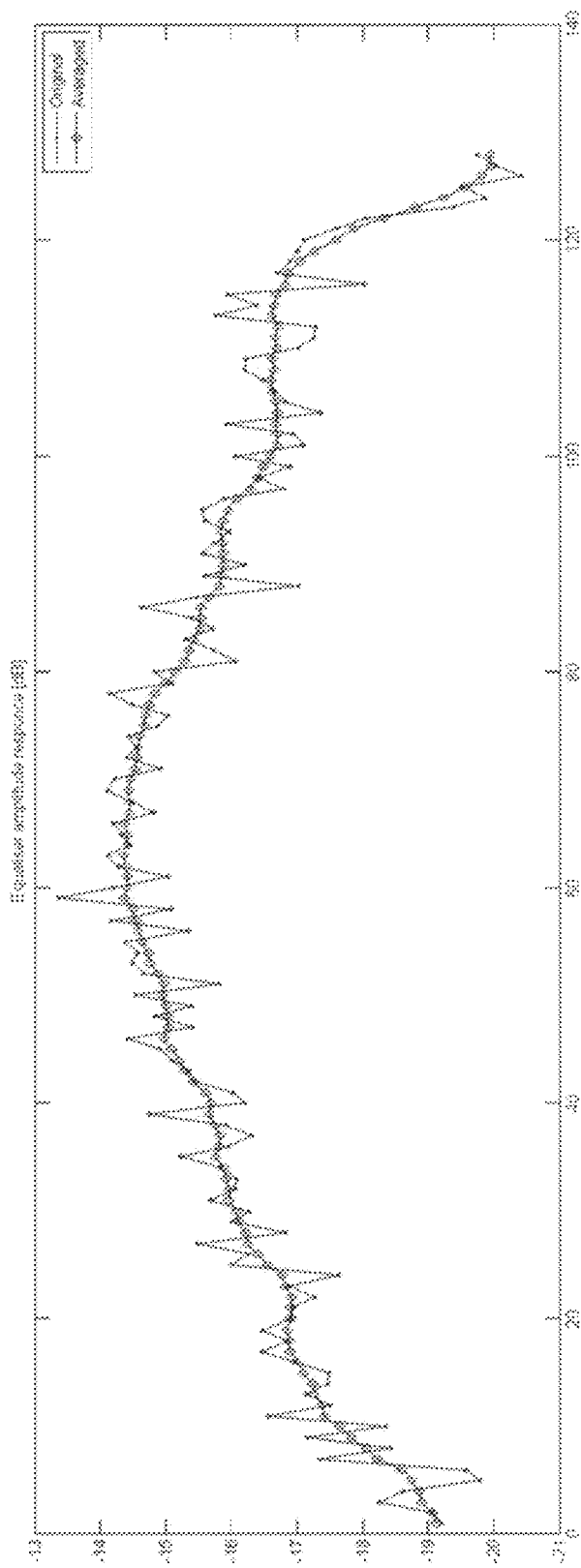
FIG. 11 is a graph of an equalizer amplitude response in some embodiments.

FIG. 11 is a graph of an equalizer amplitude response in some embodiments. The X axis indicates the frequency components and the Y axis identifies the amount the signal is attenuated in decibels.

The jagged line with dots shows the result of equalization of the amplitude using frequency equalization without averaging frequency points in the frequency domain. In this example, the jagged line indicates the noise caused by nonlinear effects of components. The smoother line indicated with diamonds is generated using frequency equalization with averaging of preamble frequency points in the frequency domain. As shown, the smoother line corrects and/or reduces the nonlinear effects thereby improving generation and/or selection of correction filter(s) to apply to the data in the frequency domain.

Figure 12:
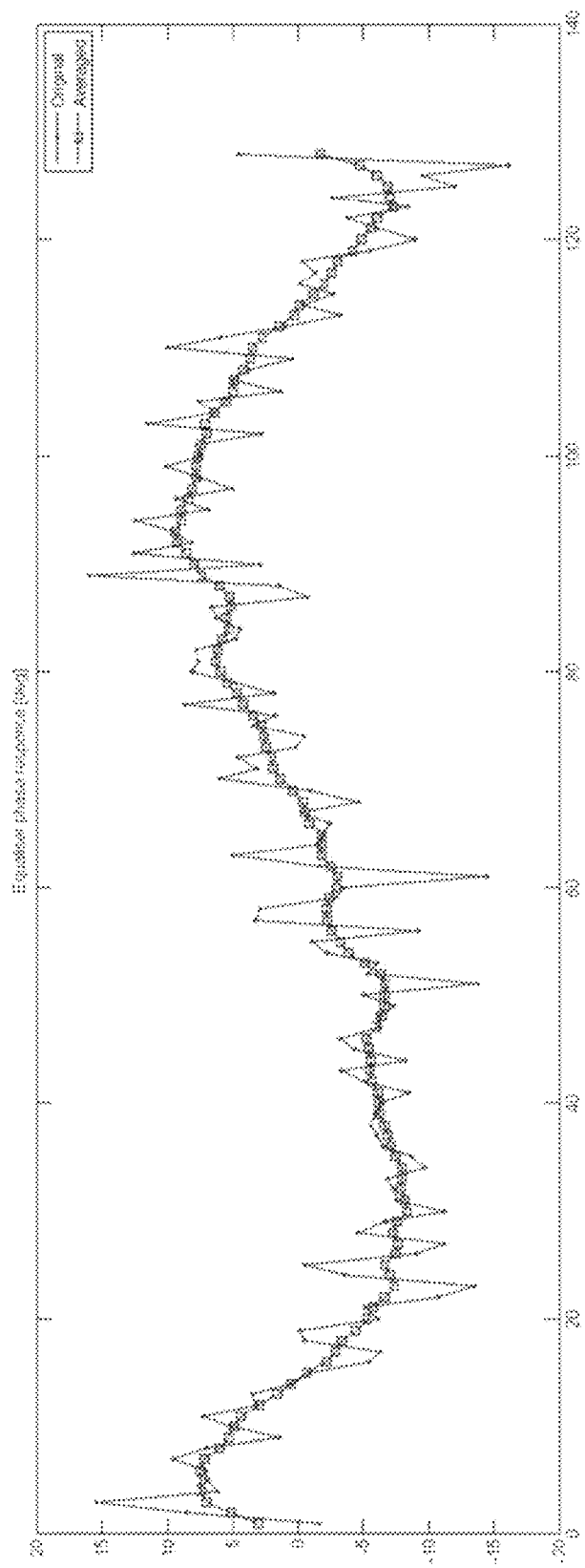
FIG. 12 is a graph of an equalizer phase response in some embodiments.

FIG. 12 is a graph of an equalizer phase response in some embodiments. The jagged line with dots shows the result of equalization of the phase using frequency equalization without averaging frequency points in the frequency domain. In this example, the jagged line indicates the noise caused by nonlinear effects of components. The smoother line indicated with diamonds is generated using frequency equalization with averaging of preamble frequency points in the frequency domain. As shown, the smoother line corrects and/or reduces the nonlinear effects thereby improving generation and/or selection of correction filter(s) to apply to the data in the frequency domain.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A system comprising:
an antenna configured to receive a signal from a transmitting radio frequency unit, the signal including a preamble containing bits for a known sequence of a predetermined length; and
a modem configured to:
retrieve the preamble from the signal;
transform the preamble from a time domain into a frequency domain, the transforming the preamble into the frequency domain causing generation of preamble-based frequency points in the frequency domain;
group neighboring frequency points of the preamble-based frequency points in the frequency domain to generate one or more groups of neighboring preamble-based frequency points, each group of neighboring preamble-based frequency points including a particular number of neighboring preamble-based frequency points, the particular number being based on an amount of error in the signal;
generate a representative point in the frequency domain for each group of neighboring preamble-based frequency points;
compare each representative point to an expected frequency response in the frequency domain, the expected frequency response being based on the known sequence of the predetermined length in the frequency domain, the comparison to be used to determine an effect of nonlinear noise in the signal;
determine a correction filter based on the comparison to apply to data received by the antenna, the correction filter configured to reduce the effect of the nonlinear noise on the data;
transform the data received by the antenna from the time domain to the frequency domain;

apply the correction filter to the data in the frequency domain to create corrected data in the frequency domain;
transform the corrected data from the frequency domain back to the time domain; and
provide the corrected data for processing.

2. The system of claim 1, further comprising a second correction filter configured to adjust the signal to correct for known hardware imperfections of a receiver.

3. The system of claim 1, wherein the modem is further configured to identify and retrieve a cyclic prefix from the signal.

4. The system of claim 1, wherein at least some of the nonlinear noise is generated by components of the transmitting radio frequency unit.

5. The system of claim 1, wherein at least some of the nonlinear noise is generated by components of a receiving radio frequency unit.

6. The system of claim 1, wherein the correction filter is configured to apply an inverse function based on a difference between each representative point and the expected frequency response in the frequency domain to the data.

7. The system of claim 1, wherein the modem is further configured to select the correction filter from a plurality of preexisting correction filters based on the comparison of each representative point to the expected frequency response.

8. The system of claim 1, wherein the expected frequency response is generated by transforming a reference signal to the frequency domain, the reference signal comprising a same sequence of symbols as the known sequence, the reference signal having not been transmitted from the transmitting radio frequency unit to the antenna.

9. The system of claim 1, wherein the modem is a part of a microwave receiving radio frequency unit coupled to the antenna.

10. The system of claim 9, wherein the transmitting radio frequency unit transmits the signal to the microwave receiving radio frequency unit via line of sight propagation.

11. A method performed by a communication device, the method comprising:
receiving a signal from a transmitting radio frequency unit, the signal including a preamble containing bits for a known sequence of a predetermined length;
transforming the preamble from a time domain into a frequency domain, the transforming the preamble into the frequency domain causing generation of preamble-based frequency points in the frequency domain;
grouping neighboring frequency points of the preamble-based frequency points in the frequency domain to generate one or more groups of neighboring preamble-based frequency points, each group of neighboring preamble-based frequency points including a particular number of neighboring preamble-based frequency points, the particular number being based on an amount of error in the signal;
generating a representative point in the frequency domain for each group of neighboring preamble-based frequency points;
comparing each representative point to an expected frequency response in the frequency domain, the expected frequency response being based on the known sequence of the predetermined length in the frequency domain, the comparison to be used to determine an effect of nonlinear noise in the signal;
determining a correction filter based on the comparison to apply to data received by an antenna, the correction filter configured to reduce the effect of the nonlinear noise on the data;
transforming the data received by the antenna from the time domain to the frequency domain;
applying the correction filter to the data in the frequency domain to create corrected data in the frequency domain;
transforming the corrected data from the frequency domain back to the time domain; and
providing the corrected data for processing.

12. The method of claim 11, further comprising filtering the signal with a second correction filter configured to adjust the signal to correct for known hardware imperfections of a receiver.

13. The method of claim 11, further comprising identifying and retrieving a cyclic prefix from the signal.

14. The method of claim 11, wherein at least some of the nonlinear noise is generated by components of the transmitting radio frequency unit.

15. The method of claim 11, wherein at least some of the nonlinear noise is generated by components of a receiving radio frequency unit.

16. The method of claim 11, wherein the correction filter is configured to apply an inverse function based on a difference between each representative point and the expected frequency response in the frequency domain to the data.

17. The method of claim 11, wherein the correction filter is selected from a plurality of preexisting correction filters based on the comparison of each representative point to the expected frequency response.

18. The method of claim 11, wherein the expected frequency response is generated by transforming a reference signal to the frequency domain, the reference signal comprising a same sequence of symbols as the known sequence, the reference signal having not been transmitted from the transmitting radio frequency unit to the antenna.

19. The method of claim 11, wherein a microwave receiving radio frequency unit is configured to receive the signal from the transmitting radio frequency unit.

20. The method of claim 19, wherein the transmitting radio frequency unit transmits the signal to the microwave receiving radio frequency unit via line of sight propagation.

21. A non-transitory computer readable medium comprising instructions executable by a processor to perform a method, the method comprising:
receiving a signal from a transmitting radio frequency unit, the signal including a preamble containing bits for a known sequence of a predetermined length;
transforming the preamble from a time domain into a frequency domain, the transforming the preamble into the frequency domain causing generation of preamble-based frequency points in the frequency domain;
grouping neighboring frequency points of the preamble-based frequency points in the frequency domain to generate one or more groups of neighboring preamble-based frequency points, each group of neighboring preamble-based frequency points including a particular number of neighboring preamble-based frequency points, the particular number being based on an amount of error in the signal;
generating a representative point in the frequency domain for each group of neighboring preamble-based frequency points;

comparing each representative point to an expected frequency response in the frequency domain, the expected frequency response being based on the known sequence of the predetermined length in the frequency domain, the comparison to be used to determine an effect of nonlinear noise in the signal;

determining a correction filter based on the comparison to apply to data received by an antenna, the correction filter configured to reduce the effect of the nonlinear noise on the data;

transforming the data received by the antenna from the time domain to the frequency domain;

applying the correction filter to the data in the frequency domain to create corrected data in the frequency domain;

transforming the corrected data from the frequency domain back to the time domain; and providing the corrected data for processing.

* * * * *